United States Patent
Modak

(10) Patent No.: US 12,435,156 B2
(45) Date of Patent: Oct. 7, 2025

(54) METHODS FOR TREATING NEUROBLASTOMA WITH COMBINATION THERAPY

(71) Applicant: MEMORIAL SLOAN-KETTERING CANCER CENTER, New York, NY (US)

(72) Inventor: Shakeel Modak, New York, NY (US)

(73) Assignee: MEMORIAL SLOAN-KETTERING CANCER CENTER, New York, NY (US)

( * ) Notice: Subject to any disclaimer, the term of this patent is extended or adjusted under 35 U.S.C. 154(b) by 538 days.

(21) Appl. No.: 17/181,321

(22) Filed: Feb. 22, 2021

(65) Prior Publication Data

US 2021/0198379 A1  Jul. 1, 2021

Related U.S. Application Data

(63) Continuation of application No. PCT/US2019/047657, filed on Aug. 22, 2019.

(60) Provisional application No. 62/721,433, filed on Aug. 22, 2018.

(51) Int. Cl.
| | |
|---|---|
| *A61P 35/00* | (2006.01) |
| *A61K 31/437* | (2006.01) |
| *A61K 31/53* | (2006.01) |
| *A61K 38/19* | (2006.01) |
| *C07K 16/30* | (2006.01) |
| *A61K 39/00* | (2006.01) |

(52) U.S. Cl.
CPC ........ *C07K 16/3084* (2013.01); *A61K 31/437* (2013.01); *A61K 31/53* (2013.01); *A61K 38/193* (2013.01); *A61P 35/00* (2018.01); *A61K 2039/505* (2013.01)

(58) Field of Classification Search
CPC .................................................. C07K 16/3084
USPC ...................................................... 424/133.1
See application file for complete search history.

(56) References Cited

U.S. PATENT DOCUMENTS

| | | | |
|---|---|---|---|
| 4,810,643 A | 3/1989 | Souza | |
| 4,999,291 A | 3/1991 | Souza | |
| 5,229,496 A | 7/1993 | Deeley et al. | |
| 5,391,485 A | 2/1995 | Deeley et al. | |
| 5,393,870 A | 2/1995 | Deeley et al. | |
| 5,528,823 A | 6/1996 | Rudy, Jr. et al. | |
| 5,580,755 A | 12/1996 | Souza | |
| 9,315,585 B2 | 4/2016 | Cheung et al. | |
| 9,688,772 B2 | 6/2017 | Cheung et al. | |
| 10,287,365 B2 | 5/2019 | Cheung et al. | |
| 2013/0216528 A1* | 8/2013 | Cheung | C07K 16/46 |
| | | | 435/7.1 |

FOREIGN PATENT DOCUMENTS

WO   WO 2011 160119 A2   12/2011

OTHER PUBLICATIONS

Paul (Fundamental Immunology, 3rd Edition, 1993, pp. 292-295) (Year: 1993).*
Bendig M. M. (Methods: A Companion to Methods in Enzymology, 1995; 8:83-93) (Year: 1995).*
Rudikoff et al. (Proceedings of the National Academy of Sciences USA, vol. 79, p. 1979-1983, 1982) (Year: 1982).*
Komenaka et al., Clinics in Dermatology, 2004, vol. 22, p. 251-265 (Year: 2004).*
Evans et al. (Q. J. Med 1999: 92: 299-307) (Year: 1999).*
Schiffman et al. (The New England Journal of Medicine, Vo. 353, No. 20, p. 2101-2104, 2005) (Year: 2005).*
Cuzick et al. (The Lancet, vol. 361, p. 296-300, 2003) (Year: 2003).*
Hernandez-Ledesma (Peptides, vol. 30, p. 426-430, 2009) (Year: 2009).*
Memorial Sloan Kettering Cancer Center (NCT03189706, published Jun. 16, 2017) (Year: 2017).*
Memorial Sloan Kettering Cancer Center (NCT01757626, published Dec. 31, 2012) (Year: 2012).*
Memorial Sloan Kettering Cancer Center (NCT00450307; Dec. 16, 2013).*
Inagaki et al (Journal of Pediatric Hematology/Oncology, 2005, 27(11): 604-606).*
Sarosdy et al (Investigational New Drugs, 1986, 4: 135-139).*
Bagatell et al., "Destabilization of steroid receptors by Hsp90-binding drugs: a ligand independent approach to hormonal therapy of breast cancer," *Clin. Cancer Res.*, 7: 2076-2084 (2001).
Bird et al., "Single-Chain Antigen-Binding Proteins," Science 242:423-426 (1988).
Cheung et al., "Monoclonal Antibodies to a Glycolipid Antigen on Human Neuroblastoma Cells," Cancer Res 45, 2642-2649 (1985).
Emens, et al., "Chemotherapy: Friend or foe to cancer vaccines?," Curr. Opinion Mol. Ther. 3(1):77-84 (2001).
Federico et al., "A Pilot Trial of Humanized Anti-GD2 Monoclonal Antibody (hu14.18K322A) with Chemotherapy and Natural Killer Cells in Children with Recurrent/Refractory Neuroblastoma," Clin Cancer Res., 6441-6449 (2017).
Huston et al., "Protein engineering of antibody binding sites: Recovery of specific activity in an anti-digoxin single-chain Fv analogue produced in *Escherichia coli*," Proc. Natl. Acad. Sci. 85:5879-5883 (1988).
International Search Report dated Jan. 2, 2020 in corresponding International Patent Application No. PCT/US2019/047657.
Kabat et al., "Sequences of Proteins of Immunological Interest," 4th U.S. Department of Health and Human Services, National Institutes of Health (1987).

(Continued)

*Primary Examiner* — Sean E Aeder
(74) *Attorney, Agent, or Firm* — Baker Botts L.L.P.

(57) ABSTRACT

The present disclosure provides methods of treating neuroblastoma using an anti-GD2 antibody, at least one chemotherapeutic agent, and at least one hematopoietic growth factor. The present disclosure also provides compositions for treating neuroblastoma.

15 Claims, No Drawings

Specification includes a Sequence Listing.

(56) References Cited

OTHER PUBLICATIONS

Kushner et al., "Irinotecan Plus Temozolomide for Relapsed or Refractory Neuroblastoma," J Clin Oncol 24:33, 5271-5276 (2006).
Kushner et al., "Lack of survival advantage with autologous stem-cell transplantation in high-risk neuroblastoma consolidated by anti-GD2 immunotherapy and isotretinoin," *Oncotarget*, 7(4), 4155-4166 (2016).
Mujoo et al., "Functional Properties and Effect on Growth Suppression of Human Neuroblastoma Tumors by Isotype Switch Variants of Monoclonal Antiganglioside GD2 Antibody 14.18," Cancer Res 49, 2857-2861 (1989).
Wahl et al., "Improved Radioimaging and Tumor Localization with Monoclonal F(ab')2," J. Nucl. Med. 24:316-325 (1983).
Ward et al., "Binding activities of a repertoire of single immunoglobulin variable domains secreted from *Escherichia coli*," Nature 341:544-546 (1989).

\* cited by examiner

SEQUENCE LISTING

```
<160> NUMBER OF SEQ ID NOS: 11

<210> SEQ ID NO 1
<211> LENGTH: 449
<212> TYPE: PRT
```

<213> ORGANISM: Artificial Sequence
<220> FEATURE:
<223> OTHER INFORMATION: Synthetic

<400> SEQUENCE: 1

```
Gln Val Gln Leu Lys Glu Ser Gly Pro Gly Leu Val Ala Pro Ser Gln
1               5                   10                  15

Ser Leu Ser Ile Thr Cys Thr Val Ser Gly Phe Ser Val Thr Asn Tyr
            20                  25                  30

Gly Val His Trp Val Arg Gln Pro Pro Gly Lys Gly Leu Glu Trp Leu
        35                  40                  45

Gly Val Ile Trp Ala Gly Gly Ile Thr Asn Tyr Asn Ser Ala Phe Met
    50                  55                  60

Ser Arg Leu Ser Ile Ser Lys Asp Asn Ser Lys Ser Gln Val Phe Leu
65              70                  75                  80

Lys Met Asn Ser Leu Gln Ile Asp Asp Thr Ala Met Tyr Tyr Cys Ala
                85                  90                  95

Ser Arg Gly Gly His Tyr Gly Tyr Ala Leu Asp Tyr Trp Gly Gln Gly
            100                 105                 110

Thr Ser Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Arg Val Glu Pro Lys Ser Cys Asp Lys
    210                 215                 220

Thr His Thr Cys Pro Pro Cys Pro Ala Pro Glu Leu Leu Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Asn Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Asp Glu Leu Thr Lys Asn Gln Val Ser Leu Thr
        355                 360                 365

Cys Leu Val Lys Gly Phe Tyr Pro Ser Asp Ile Ala Val Glu Trp Glu
    370                 375                 380

Ser Asn Gly Gln Pro Glu Asn Asn Tyr Lys Thr Thr Pro Pro Val Leu
```

```
                385                 390                 395                 400
Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
            435                 440                 445

Lys

<210> SEQ ID NO 2
<211> LENGTH: 211
<212> TYPE: PRT
<213> ORGANISM: Artificial Sequence
<220> FEATURE:
<223> OTHER INFORMATION: Synthetic

<400> SEQUENCE: 2

Ser Ile Val Met Thr Gln Thr Pro Lys Phe Leu Leu Val Ser Ala Gly
1               5                   10                  15

Asp Arg Val Thr Ile Thr Cys Lys Ala Ser Gln Ser Val Ser Asn Asp
            20                  25                  30

Val Thr Trp Tyr Gln Gln Lys Ala Gly Gln Ser Pro Lys Leu Leu Ile
        35                  40                  45

Tyr Ser Ala Ser Asn Arg Tyr Ser Gly Val Pro Asp Arg Phe Thr Gly
    50                  55                  60

Ser Gly Tyr Gly Thr Ala Phe Thr Phe Thr Ile Ser Thr Val Gln Ala
65                  70                  75                  80

Glu Asp Leu Ala Val Tyr Phe Cys Gln Gln Asp Tyr Ser Ser Phe Gly
                85                  90                  95

Gly Gly Thr Lys Leu Glu Ile Lys Arg Thr Val Ala Ala Pro Ser Val
            100                 105                 110

Phe Ile Phe Pro Pro Ser Asp Glu Gln Leu Lys Ser Gly Thr Ala Ser
        115                 120                 125

Val Val Cys Leu Leu Asn Asn Phe Tyr Pro Arg Glu Ala Lys Val Gln
    130                 135                 140

Trp Lys Val Asp Asn Ala Leu Gln Ser Gly Asn Ser Gln Glu Ser Val
145                 150                 155                 160

Thr Glu Gln Asp Ser Lys Asp Ser Thr Tyr Ser Leu Ser Ser Thr Leu
                165                 170                 175

Thr Leu Ser Lys Ala Asp Tyr Glu Lys His Lys Val Tyr Ala Cys Glu
            180                 185                 190

Val Thr His Gln Gly Leu Ser Ser Pro Val Thr Lys Ser Phe Asn Arg
        195                 200                 205

Gly Glu Cys
    210

<210> SEQ ID NO 3
<211> LENGTH: 446
<212> TYPE: PRT
<213> ORGANISM: Artificial Sequence
<220> FEATURE:
<223> OTHER INFORMATION: Synthetic

<400> SEQUENCE: 3

Gln Val Gln Leu Lys Glu Ser Gly Pro Gly Leu Val Ala Pro Ser Gln
1               5                   10                  15

Ser Leu Ser Ile Thr Cys Thr Val Ser Gly Phe Ser Val Thr Asn Tyr
```

```
                20                  25                  30
Gly Val His Trp Val Arg Gln Pro Gly Lys Gly Leu Glu Trp Leu
            35                  40                  45
Gly Val Ile Trp Ala Gly Gly Ile Thr Asn Tyr Asn Ser Ala Phe Met
50                  55                  60
Ser Arg Leu Ser Ile Ser Lys Asp Asn Ser Lys Ser Gln Val Phe Leu
65                  70                  75                  80
Lys Met Asn Ser Leu Gln Ile Asp Asp Thr Ala Met Tyr Tyr Cys Ala
                85                  90                  95
Ser Arg Gly Gly His Tyr Gly Tyr Ala Leu Asp Tyr Trp Gly Gln Gly
            100                 105                 110
Thr Ser Val Thr Val Ser Ser Ala Ser Thr Lys Gly Pro Ser Val Phe
            115                 120                 125
Pro Leu Ala Pro Cys Ser Arg Ser Thr Ser Glu Ser Thr Ala Ala Leu
            130                 135                 140
Gly Cys Leu Val Lys Asp Tyr Phe Pro Glu Pro Val Thr Val Ser Trp
145                 150                 155                 160
Asn Ser Gly Ala Leu Thr Ser Gly Val His Thr Phe Pro Ala Val Leu
                165                 170                 175
Gln Ser Ser Gly Leu Tyr Ser Leu Ser Ser Val Val Thr Val Pro Ser
            180                 185                 190
Ser Ser Leu Gly Thr Lys Thr Tyr Thr Cys Asn Val Asp His Lys Pro
            195                 200                 205
Ser Asn Thr Lys Val Asp Lys Arg Val Glu Ser Lys Tyr Gly Pro Pro
210                 215                 220
Cys Pro Ser Cys Pro Ala Pro Glu Phe Leu Gly Gly Pro Ser Val Phe
225                 230                 235                 240
Leu Phe Pro Pro Lys Pro Lys Asp Thr Leu Met Ile Ser Arg Thr Pro
                245                 250                 255
Glu Val Thr Cys Val Val Val Asp Val Ser Gln Glu Asp Pro Glu Val
            260                 265                 270
Gln Phe Asn Trp Tyr Val Asp Gly Val Glu Val His Asn Ala Lys Thr
            275                 280                 285
Lys Pro Arg Glu Glu Gln Phe Asn Ser Thr Tyr Arg Val Val Ser Val
            290                 295                 300
Leu Thr Val Leu His Gln Asp Trp Leu Asn Gly Lys Glu Tyr Lys Cys
305                 310                 315                 320
Lys Val Ser Asn Lys Gly Leu Pro Ser Ser Ile Glu Lys Thr Ile Ser
                325                 330                 335
Lys Ala Lys Gly Gln Pro Arg Glu Pro Gln Val Tyr Thr Leu Pro Pro
            340                 345                 350
Ser Gln Glu Glu Met Thr Lys Asn Gln Val Ser Leu Thr Cys Leu Val
            355                 360                 365
Lys Gly Phe Tyr Pro Ser Asp Ile Ala Val Glu Trp Glu Ser Asn Gly
            370                 375                 380
Gln Pro Glu Asn Asn Tyr Lys Thr Thr Pro Pro Val Leu Asp Ser Asp
385                 390                 395                 400
Gly Ser Phe Phe Leu Tyr Ser Arg Leu Thr Val Asp Lys Ser Arg Trp
                405                 410                 415
Gln Glu Gly Asn Val Phe Ser Cys Ser Val Met His Glu Ala Leu His
            420                 425                 430
Asn His Tyr Thr Gln Lys Ser Leu Ser Leu Ser Leu Gly Lys
            435                 440                 445
```

<210> SEQ ID NO 4
<211> LENGTH: 448
<212> TYPE: PRT
<213> ORGANISM: Artificial Sequence
<220> FEATURE:
<223> OTHER INFORMATION: Synthetic

<400> SEQUENCE: 4

```
Gln Val Gln Leu Val Glu Ser Gly Pro Gly Val Val Gln Pro Gly Arg
1               5                   10                  15

Ser Leu Arg Ile Ser Cys Ala Val Ser Gly Phe Ser Val Thr Asn Tyr
            20                  25                  30

Gly Val His Trp Val Arg Gln Pro Pro Gly Lys Gly Leu Glu Trp Leu
        35                  40                  45

Gly Val Ile Trp Ala Gly Gly Ile Thr Asn Tyr Asn Ser Ala Phe Met
    50                  55                  60

Ser Arg Leu Thr Ile Ser Lys Asp Asn Ser Lys Asn Thr Val Tyr Leu
65                  70                  75                  80

Gln Met Asn Ser Leu Arg Ala Glu Asp Thr Ala Met Tyr Tyr Cys Ala
                85                  90                  95

Ser Arg Gly Gly His Tyr Gly Tyr Ala Leu Asp Tyr Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Arg Val Glu Pro Lys Ser Cys Asp Lys
    210                 215                 220

Thr His Thr Cys Pro Pro Cys Pro Ala Pro Glu Leu Leu Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Asn Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Asp Glu Leu Thr Lys Asn Gln Val Ser Leu Thr
        355                 360                 365
```

-continued

Cys Leu Val Lys Gly Phe Tyr Pro Ser Asp Ile Ala Val Glu Trp Glu
        370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
                420                 425                 430

Ala Leu His Asn His Tyr Thr Gln Lys Ser Leu Ser Leu Ser Pro Gly
            435                 440                 445

<210> SEQ ID NO 5
<211> LENGTH: 211
<212> TYPE: PRT
<213> ORGANISM: Artificial Sequence
<220> FEATURE:
<223> OTHER INFORMATION: Synthetic

<400> SEQUENCE: 5

Glu Ile Val Met Thr Gln Thr Pro Ala Thr Leu Ser Val Ser Ala Gly
1               5                   10                  15

Glu Arg Val Thr Ile Thr Cys Lys Ala Ser Gln Ser Val Ser Asn Asp
                20                  25                  30

Val Thr Trp Tyr Gln Gln Lys Pro Gly Gln Ala Pro Arg Leu Leu Ile
            35                  40                  45

Tyr Ser Ala Ser Asn Arg Tyr Ser Gly Val Pro Ala Arg Phe Ser Gly
        50                  55                  60

Ser Gly Tyr Gly Thr Glu Phe Thr Phe Thr Ile Ser Ser Val Gln Ser
65                  70                  75                  80

Glu Asp Phe Ala Val Tyr Phe Cys Gln Gln Asp Tyr Ser Ser Phe Gly
                85                  90                  95

Gln Gly Thr Lys Leu Glu Ile Lys Arg Thr Val Ala Ala Pro Ser Val
            100                 105                 110

Phe Ile Phe Pro Pro Ser Asp Glu Gln Leu Lys Ser Gly Thr Ala Ser
        115                 120                 125

Val Val Cys Leu Leu Asn Asn Phe Tyr Pro Arg Glu Ala Lys Val Gln
130                 135                 140

Trp Lys Val Asp Asn Ala Leu Gln Ser Gly Asn Ser Gln Glu Ser Val
145                 150                 155                 160

Thr Glu Gln Asp Ser Lys Asp Ser Thr Tyr Ser Leu Ser Ser Thr Leu
                165                 170                 175

Thr Leu Ser Lys Ala Asp Tyr Glu Lys His Lys Val Tyr Ala Cys Glu
            180                 185                 190

Val Thr His Gln Gly Leu Ser Ser Pro Val Thr Lys Ser Phe Asn Arg
        195                 200                 205

Gly Glu Cys
    210

<210> SEQ ID NO 6
<211> LENGTH: 448
<212> TYPE: PRT
<213> ORGANISM: Artificial Sequence
<220> FEATURE:
<223> OTHER INFORMATION: Synthetic

<400> SEQUENCE: 6

Gln Val Gln Leu Lys Glu Ser Gly Pro Gly Val Val Gln Pro Gly Gln

-continued

```
1               5                   10                  15
Ser Leu Ser Ile Ser Cys Ala Val Ser Gly Phe Ser Val Thr Asn Tyr
                20                  25                  30
Gly Val His Trp Val Arg Gln Pro Gly Lys Gly Leu Glu Trp Leu
                35                  40                  45
Gly Val Ile Trp Ala Gly Gly Ile Thr Asn Tyr Asn Ser Ala Phe Met
                50                  55                  60
Ser Arg Leu Thr Ile Ser Lys Asp Asn Ser Lys Ser Thr Val Tyr Leu
65                  70                  75                  80
Lys Met Asn Ser Leu Gln Ala Glu Asp Thr Ala Met Tyr Tyr Cys Ala
                85                  90                  95
Ser Arg Gly Gly His Tyr Gly Tyr Ala Leu Asp Tyr Trp Gly Gln Gly
                100                 105                 110
Thr Leu Val Thr Val Ser Ala Ser Thr Lys Gly Pro Ser Val Phe
                115                 120                 125
Pro Leu Ala Pro Ser Ser Lys Ser Thr Ser Gly Gly Thr Ala Ala Leu
130                 135                 140
Gly Cys Leu Val Lys Asp Tyr Phe Pro Glu Pro Val Thr Val Ser Trp
145                 150                 155                 160
Asn Ser Gly Ala Leu Thr Ser Gly Val His Thr Phe Pro Ala Val Leu
                165                 170                 175
Gln Ser Ser Gly Leu Tyr Ser Leu Ser Ser Val Val Thr Val Pro Ser
                180                 185                 190
Ser Ser Leu Gly Thr Gln Thr Tyr Ile Cys Asn Val Asn His Lys Pro
                195                 200                 205
Ser Asn Thr Lys Val Asp Lys Arg Val Glu Pro Lys Ser Cys Asp Lys
210                 215                 220
Thr His Thr Cys Pro Pro Cys Pro Ala Pro Glu Leu Leu Gly Gly Pro
225                 230                 235                 240
Ser Val Phe Leu Phe Pro Pro Lys Pro Lys Asp Thr Leu Met Ile Ser
                245                 250                 255
Arg Thr Pro Glu Val Thr Cys Val Val Val Asp Val Ser His Glu Asp
                260                 265                 270
Pro Glu Val Lys Phe Asn Trp Tyr Val Asp Gly Val Glu Val His Asn
                275                 280                 285
Ala Lys Thr Lys Pro Arg Glu Glu Gln Tyr Asn Ser Thr Tyr Arg Val
                290                 295                 300
Val Ser Val Leu Thr Val Leu His Gln Asp Trp Leu Asn Gly Lys Glu
305                 310                 315                 320
Tyr Lys Cys Lys Val Ser Asn Lys Ala Leu Pro Ala Pro Ile Glu Lys
                325                 330                 335
Thr Ile Ser Lys Ala Lys Gly Gln Pro Arg Glu Pro Gln Val Tyr Thr
                340                 345                 350
Leu Pro Pro Ser Arg Asp Glu Leu Thr Lys Asn Gln Val Ser Leu Thr
                355                 360                 365
Cys Leu Val Lys Gly Phe Tyr Pro Ser Asp Ile Ala Val Glu Trp Glu
370                 375                 380
Ser Asn Gly Gln Pro Glu Asn Asn Tyr Lys Thr Thr Pro Pro Val Leu
385                 390                 395                 400
Asp Ser Asp Gly Ser Phe Phe Leu Tyr Ser Lys Leu Thr Val Asp Lys
                405                 410                 415
Ser Arg Trp Gln Gln Gly Asn Val Phe Ser Cys Ser Val Met His Glu
                420                 425                 430
```

Ala Leu His Asn His Tyr Thr Gln Lys Ser Leu Ser Leu Ser Pro Gly
            435                 440                 445

<210> SEQ ID NO 7
<211> LENGTH: 211
<212> TYPE: PRT
<213> ORGANISM: Artificial Sequence
<220> FEATURE:
<223> OTHER INFORMATION: Synthetic

<400> SEQUENCE: 7

Ser Ile Val Met Thr Gln Thr Pro Lys Thr Leu Ser Val Ser Ala Gly
1               5                   10                  15

Glu Arg Val Thr Ile Thr Cys Lys Ala Ser Gln Ser Val Ser Asn Asp
            20                  25                  30

Val Thr Trp Tyr Gln Gln Lys Pro Gly Gln Ser Pro Lys Leu Leu Ile
        35                  40                  45

Tyr Ser Ala Ser Asn Arg Tyr Ser Gly Val Pro Asp Arg Phe Ser Gly
50                  55                  60

Ser Gly Tyr Gly Thr Ala Phe Thr Phe Thr Ile Ser Ser Val Gln Ala
65                  70                  75                  80

Glu Asp Phe Ala Val Tyr Phe Cys Gln Gln Asp Tyr Ser Ser Phe Gly
                85                  90                  95

Gln Gly Thr Lys Leu Glu Ile Lys Arg Thr Val Ala Ala Pro Ser Val
            100                 105                 110

Phe Ile Phe Pro Pro Ser Asp Glu Gln Leu Lys Ser Gly Thr Ala Ser
        115                 120                 125

Val Val Cys Leu Leu Asn Asn Phe Tyr Pro Arg Glu Ala Lys Val Gln
130                 135                 140

Trp Lys Val Asp Asn Ala Leu Gln Ser Gly Asn Ser Gln Glu Ser Val
145                 150                 155                 160

Thr Glu Gln Asp Ser Lys Asp Ser Thr Tyr Ser Leu Ser Ser Thr Leu
                165                 170                 175

Thr Leu Ser Lys Ala Asp Tyr Glu Lys His Lys Val Tyr Ala Cys Glu
            180                 185                 190

Val Thr His Gln Gly Leu Ser Ser Pro Val Thr Lys Ser Phe Asn Arg
        195                 200                 205

Gly Glu Cys
    210

<210> SEQ ID NO 8
<211> LENGTH: 446
<212> TYPE: PRT
<213> ORGANISM: Artificial Sequence
<220> FEATURE:
<223> OTHER INFORMATION: Synthetic

<400> SEQUENCE: 8

Gln Val Gln Leu Val Glu Ser Gly Pro Gly Val Val Gln Pro Gly Arg
1               5                   10                  15

Ser Leu Arg Ile Ser Cys Ala Val Ser Gly Phe Ser Val Thr Asn Tyr
            20                  25                  30

Gly Val His Trp Val Arg Gln Pro Pro Gly Lys Gly Leu Glu Trp Leu
        35                  40                  45

Gly Val Ile Trp Ala Gly Gly Ile Thr Asn Tyr Asn Ser Ala Phe Met
50                  55                  60

Ser Arg Leu Thr Ile Ser Lys Asp Asn Ser Lys Asn Thr Val Tyr Leu

```
            65                  70                  75                  80
        Gln Met Asn Ser Leu Arg Ala Glu Asp Thr Ala Met Tyr Tyr Cys Ala
                        85                  90                  95

Ser Arg Gly Gly His Tyr Gly Tyr Ala Leu Asp Tyr Trp Gly Gln Gly
                        100                 105                 110

Thr Leu Val Thr Val Ser Ser Ala Ser Thr Lys Gly Pro Ser Val Phe
                        115                 120                 125

Pro Leu Ala Pro Cys Ser Arg Ser Thr Ser Glu Ser Thr Ala Ala Leu
                        130                 135                 140

Gly Cys Leu Val Lys Asp Tyr Phe Pro Glu Pro Val Thr Val Ser Trp
        145                 150                 155                 160

Asn Ser Gly Ala Leu Thr Ser Gly Val His Thr Phe Pro Ala Val Leu
                        165                 170                 175

Gln Ser Ser Gly Leu Tyr Ser Leu Ser Ser Val Val Thr Val Pro Ser
                        180                 185                 190

Ser Ser Leu Gly Thr Lys Thr Tyr Thr Cys Asn Val Asp His Lys Pro
                        195                 200                 205

Ser Asn Thr Lys Val Asp Lys Arg Val Glu Ser Lys Tyr Gly Pro Pro
        210                 215                 220

Cys Pro Ser Cys Pro Ala Pro Glu Phe Leu Gly Gly Pro Ser Val Phe
        225                 230                 235                 240

Leu Phe Pro Pro Lys Pro Lys Asp Thr Leu Met Ile Ser Arg Thr Pro
                        245                 250                 255

Glu Val Thr Cys Val Val Val Asp Val Ser Gln Glu Asp Pro Glu Val
                        260                 265                 270

Gln Phe Asn Trp Tyr Val Asp Gly Val Glu Val His Asn Ala Lys Thr
                        275                 280                 285

Lys Pro Arg Glu Glu Gln Phe Asn Ser Thr Tyr Arg Val Val Ser Val
                        290                 295                 300

Leu Thr Val Leu His Gln Asp Trp Leu Asn Gly Lys Glu Tyr Lys Cys
        305                 310                 315                 320

Lys Val Ser Asn Lys Gly Leu Pro Ser Ser Ile Glu Lys Thr Ile Ser
                        325                 330                 335

Lys Ala Lys Gly Gln Pro Arg Glu Pro Gln Val Tyr Thr Leu Pro Pro
                        340                 345                 350

Ser Gln Glu Glu Met Thr Lys Asn Gln Val Ser Leu Thr Cys Leu Val
                        355                 360                 365

Lys Gly Phe Tyr Pro Ser Asp Ile Ala Val Glu Trp Glu Ser Asn Gly
                        370                 375                 380

Gln Pro Glu Asn Asn Tyr Lys Thr Thr Pro Pro Val Leu Asp Ser Asp
        385                 390                 395                 400

Gly Ser Phe Phe Leu Tyr Ser Arg Leu Thr Val Asp Lys Ser Arg Trp
                        405                 410                 415

Gln Glu Gly Asn Val Phe Ser Cys Ser Val Met His Glu Ala Leu His
                        420                 425                 430

Asn His Tyr Thr Gln Lys Ser Leu Ser Leu Ser Leu Gly Lys
                        435                 440                 445

<210> SEQ ID NO 9
<211> LENGTH: 449
<212> TYPE: PRT
<213> ORGANISM: Artificial Sequence
<220> FEATURE:
<223> OTHER INFORMATION: Synthetic
```

```
<400> SEQUENCE: 9

Gln Val Gln Leu Val Glu Ser Gly Pro Gly Leu Val Gln Pro Gly Arg
1               5                   10                  15

Ser Leu Arg Leu Thr Cys Ala Val Ser Gly Phe Ser Val Thr Asn Tyr
            20                  25                  30

Gly Val His Trp Val Arg Gln Pro Pro Gly Lys Gly Leu Glu Trp Leu
        35                  40                  45

Gly Val Ile Trp Ala Gly Gly Ile Thr Asn Tyr Asn Ser Ala Phe Met
    50                  55                  60

Ser Arg Leu Thr Ile Ser Lys Asp Asn Ser Lys Asn Thr Val Tyr Leu
65                  70                  75                  80

Gln Met Asn Ser Leu Arg Ala Glu Asp Thr Ala Val Tyr Tyr Cys Ala
                85                  90                  95

Ser Arg Gly Gly His Tyr Gly Tyr Ala Leu Asp Tyr Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Arg Val Glu Pro Lys Ser Cys Asp Lys
    210                 215                 220

Thr His Thr Cys Pro Pro Cys Pro Ala Pro Glu Leu Leu Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Asn Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Asp Glu Leu Thr Lys Asn Gln Val Ser Leu Thr
        355                 360                 365

Cys Leu Val Lys Gly Phe Tyr Pro Ser Asp Ile Ala Val Glu Trp Glu
    370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415
```

```
Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
            435                 440                 445

Lys

<210> SEQ ID NO 10
<211> LENGTH: 211
<212> TYPE: PRT
<213> ORGANISM: Artificial Sequence
<220> FEATURE:
<223> OTHER INFORMATION: Synthetic

<400> SEQUENCE: 10

Ser Ile Val Met Thr Gln Thr Pro Ala Phe Leu Leu Val Ser Ala Gly
1               5                   10                  15

Glu Arg Val Thr Ile Thr Cys Arg Ala Ser Gln Ser Val Ser Asn Asp
            20                  25                  30

Val Thr Trp Tyr Gln Gln Lys Ala Gly Gln Ala Pro Arg Leu Leu Ile
        35                  40                  45

Tyr Ser Ala Ser Asn Arg Tyr Thr Gly Ile Pro Ala Arg Phe Ser Gly
50                  55                  60

Ser Gly Tyr Gly Thr Glu Phe Thr Phe Thr Ile Ser Ser Val Gln Ser
65                  70                  75                  80

Glu Asp Phe Ala Val Tyr Phe Cys Gln Gln Asp Tyr Ser Ser Phe Gly
                85                  90                  95

Gly Gly Thr Lys Leu Glu Ile Lys Arg Thr Val Ala Ala Pro Ser Val
            100                 105                 110

Phe Ile Phe Pro Pro Ser Asp Glu Gln Leu Lys Ser Gly Thr Ala Ser
        115                 120                 125

Val Val Cys Leu Leu Asn Asn Phe Tyr Pro Arg Glu Ala Lys Val Gln
130                 135                 140

Trp Lys Val Asp Asn Ala Leu Gln Ser Gly Asn Ser Gln Glu Ser Val
145                 150                 155                 160

Thr Glu Gln Asp Ser Lys Asp Ser Thr Tyr Ser Leu Ser Ser Thr Leu
                165                 170                 175

Thr Leu Ser Lys Ala Asp Tyr Glu Lys His Lys Val Tyr Ala Cys Glu
            180                 185                 190

Val Thr His Gln Gly Leu Ser Ser Pro Val Thr Lys Ser Phe Asn Arg
        195                 200                 205

Gly Glu Cys
210

<210> SEQ ID NO 11
<211> LENGTH: 449
<212> TYPE: PRT
<213> ORGANISM: Artificial Sequence
<220> FEATURE:
<223> OTHER INFORMATION: Synthetic

<400> SEQUENCE: 11

Gln Val Gln Leu Val Glu Ser Gly Pro Gly Val Val Gln Pro Gly Arg
1               5                   10                  15

Ser Leu Arg Ile Ser Cys Ala Val Ser Gly Phe Ser Val Thr Asn Tyr
            20                  25                  30

Gly Val His Trp Val Arg Gln Pro Pro Gly Lys Gly Leu Glu Trp Leu
        35                  40                  45
```

```
Gly Val Ile Trp Ala Gly Gly Ile Thr Asn Tyr Asn Ser Ala Phe Met
 50                  55                  60

Ser Arg Leu Thr Ile Ser Lys Asp Asn Ser Lys Asn Thr Val Tyr Leu
 65                  70                  75                  80

Gln Met Asn Ser Leu Arg Ala Glu Asp Thr Ala Met Tyr Tyr Cys Ala
                 85                  90                  95

Ser Arg Gly Gly His Tyr Gly Tyr Ala Leu Asp Tyr Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Arg Val Glu Pro Lys Ser Cys Asp Lys
    210                 215                 220

Thr His Thr Cys Pro Pro Cys Pro Ala Pro Glu Leu Leu Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Asn Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Asp Glu Leu Thr Lys Asn Gln Val Ser Leu Thr
        355                 360                 365

Cys Leu Val Lys Gly Phe Tyr Pro Ser Asp Ile Ala Val Glu Trp Glu
370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
            405                 410                 415

Ser Arg Trp Gln Gln Gly Asn Val Phe Ser Cys Ser Val Met His Glu
        420                 425                 430

Ala Leu His Asn His Tyr Thr Gln Lys Ser Leu Ser Leu Ser Pro Gly
    435                 440                 445

Lys
```

METHODS FOR TREATING NEUROBLASTOMA WITH COMBINATION THERAPY

CROSS-REFERENCE TO RELATED APPLICATIONS

This application is Continuation of International Patent Application No. PCT/US19/047657, filed Aug. 22, 2019, which claims the benefit of priority of U.S. Provisional Patent Application No. 62/721,433, filed Aug. 22, 2018, the contents of each of which are incorporated by reference in their entirety, and to each of which priority is claimed.

SEQUENCE LISTING

The specification further incorporates by reference the Sequence Listing submitted herewith via EFS on Feb. 22, 2021. Pursuant to 37 C.F.R. § 1.52(e)(5), the Sequence Listing text file, identified as 072734_1214_SL.txt, is 35,354 bytes and was created on Feb. 22, 2021. The Sequence Listing electronically filed herewith, does not extend beyond the scope of the specification and thus does not contain new matter.

INTRODUCTION

The present disclosure provides methods of treating neuroblastoma (e.g., refractory and relapsed neuroblastomas) by the administration of an anti-Ganglioside D2 (anti-GD2) antibody in combination with at least one chemotherapeutic agent and at least one hematopoietic growth factor. The present disclosure also provides pharmaceutical compositions for treating neuroblastoma.

BACKGROUND

Neuroblastoma is a common extracranial solid tumor of childhood. Intensive induction chemotherapy and aggressive surgery have improved remission rates in young patients; however, results have been less impressive in adolescents and adults in whom neuroblastoma is especially chemoresistant. Realization of an effective strategy for eradicating minimal residual disease (MRD) remains a challenge. The long-term relapse-free survival rate in the most recent national study was only ~30%. Moreover, patients with refractory and relapsed neuroblastoma have poor prognosis. Thus, there are needs for improved therapeutic approaches for primary refractory and relapsed neuroblastoma.

The combination of irinotecan and temozolomide (IT) has been used as second-line chemotherapy regimen for patients with refractory or relapsed neuroblastoma. Although multiple courses of IT treatment controls disease for prolonged periods in some patients, objective response rates in patients with relapsed or refractory neuroblastoma were low (Kushner et al., J Clin Oncol (2006);24:5271-6; Bagatell et al., Clin Cancer Res (2001); 7:32-7). There have been some efforts in attempting to increase the anti-neuroblastoma activity of IT by combining IT with other chemotherapeutic agents such as temsirolimus, gefitinib, or alisertib, or targeted radiotherapy with $^{131}$I-MIBG. However, such combination therapies do not significantly improve the response rates.

SUMMARY OF THE INVENTION

The present disclosure provides methods of treating neuroblastoma by the administration of an anti-GD2 antibody in combination with at least one chemotherapeutic agent and at least one hematopoietic growth factor.

In one aspect, the present disclosure provides a method of treating neuroblastoma in a subject, comprising administering to the subject an anti-GD2 antibody or an antigen-binding fragment thereof, at least one hematopoietic growth factor, and at least one chemotherapeutic agent.

In certain embodiments, the anti-GD2 antibody or antigen-binding fragment thereof comprises a heavy chain variable region CDR1 comprising amino acids residues 31 to 35 of SEQ ID NO: 11 or SEQ ID NO: 4 or a conservative modification thereof, a heavy chain variable region CDR2 comprising amino acids residues 50 to 65 or 50 to 64 of SEQ ID NO: 11 or SEQ ID NO: 4 or a conservative modification thereof, a heavy chain variable region CDR3 comprising amino acids residues 98 to 108 of SEQ ID NO: 11 or SEQ ID NO: 4 or a conservative modification thereof, a light chain variable region CDR1 comprising amino acids residues 24 to 34 of SEQ ID NO: 5 or a conservative modification thereof, a light chain variable region CDR2 comprising amino acids residues 50 to 56 of SEQ ID NO: 5 or a conservative modification thereof, and a light chain variable region CDR3 comprising amino acids residues 89 to 95 of SEQ ID NO: 5 or a conservative modification thereof.

In certain embodiments, the anti-GD2 antibody or antigen-binding fragment thereof comprises a heavy chain variable region CDR1 comprising amino acids residues 31 to 35 of SEQ ID NO: 11 or SEQ ID NO: 4 or a conservative modification thereof, a heavy chain variable region CDR2 comprising amino acids residues 50 to 65 or 50 to 64 of SEQ ID NO: 11 or SEQ ID NO: 4 or a conservative modification thereof, a heavy chain variable region CDR3 comprising amino acids residues 98 to 108 of SEQ ID NO: 11 or SEQ ID NO: 4 or a conservative modification thereof, a light chain variable region CDR1 comprising amino acids residues 24 to 34 of SEQ ID NO: 5 or a conservative modification thereof, a light chain variable region CDR2 comprising amino acids residues 50 to 56 of SEQ ID NO: 5 or a conservative modification thereof, and a light chain variable region CDR3 comprising amino acids residues 89 to 94 of SEQ ID NO: 5 or a conservative modification thereof.

In certain embodiments, the anti-GD2 antibody or antigen-binding fragment thereof comprises a heavy chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO: 11 or SEQ ID NO: 4, and/or a light chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO: 5. In certain embodiments, the anti-GD2 antibody or antigen-binding fragment thereof comprises a heavy chain variable region comprising the amino acid sequence set forth in SEQ ID NO:11 or SEQ ID NO: 4, and a light chain variable region comprising the amino acid sequence set forth in SEQ ID NO: 5.

In certain embodiments, the anti-GD2 antibody is a humanized 3F8 (hu3F8) antibody.

In certain embodiments, the at least one hematopoietic growth factor is selected from the group consisting of a granulocyte colony-stimulating factor (G-CSF) a granulocyte-macrophage colony-stimulating factor (GM-CSF). In certain embodiments, the GM-CSF is a recombinant GM-CSF. In certain embodiments, the recombinant GM-CSF is sargramostim.

In certain embodiments, the at least one chemotherapeutic agent is selected from topoisomerase I inhibitors, and alkylating agents, and combinations thereof.

In certain embodiments, the method comprises two chemotherapeutic agents. In certain embodiments, the two chemotherapeutic agents are a topoisomerase I inhibitor, and an alkylating agent. In certain embodiments, the topoisomerase I inhibitor is irinotecan. In certain embodiments, the alkylating agent is temozolomide.

In certain embodiments, the anti-GD2 antibody or antigen-binding fragment thereof is administered in an amount of about 2.25 mg/kg per day. In certain embodiments, the anti-GD2 antibody or antigen-binding fragment thereof is administered intravenously.

In certain embodiments, the hematopoietic growth factor is administered in an amount of about 250 mg/m$^2$ per day. In certain embodiments, the hematopoietic growth factor is administered subcutaneously.

In certain embodiments, the topoisomerase I inhibitor is administered in an amount of about 50 mg/m$^2$ per day. In certain embodiments, the topoisomerase I inhibitor is administered intravenously.

In certain embodiments, the alkylating agent is administered in an amount of about 150 mg/m$^2$ per day. In certain embodiments, the alkylating agent is administered orally or intravenously.

In certain embodiments, the anti-GD2 antibody or antigen-binding fragment thereof, the at least one hematopoietic growth factor, and the at least one chemotherapeutic agent are administered cyclically. In certain embodiments, the number of cycle is from one to twenty-four cycles. In certain embodiments, one cycle comprises the administration of the anti-GD2 antibody or antigen-binding fragment thereof during four days in the cycle. In certain embodiments, the anti-GD2 antibody or antigen-binding fragment thereof is administered on day 2, 4, 8, and 10 in the cycle. In certain embodiments, one cycle comprises the administration of the at least one hematopoietic growth factor 5 days in the cycle. In certain embodiments, the at least one hematopoietic growth factor is administered on days 6-10 in the cycle. In certain embodiments, one cycle comprises the administration of the at least one chemotherapeutic agent during 5 days in the cycle. In certain embodiments, the at least one chemotherapeutic agent is administered on days 1-5 in the cycle. In certain embodiments, one cycle comprises the administration of the at least one chemotherapeutic agent during 5 days in the cycle. In certain embodiments, the duration of each cycle is 10 days.

In certain embodiments, each cycle is followed by a rest period. In certain embodiments, the rest period is from about three weeks to about five weeks. In certain embodiments, the rest period is from about four weeks to about six weeks.

In certain embodiments, the neuroblastoma is refractory neuroblastoma, relapsed neuroblastoma, or relapsed and refractory neuroblastoma.

In another aspect, the present disclosure provides a composition comprising an anti-GD2 antibody or an antigen-binding fragment thereof disclosed herein, at least one hematopoietic growth factor disclosed herein, and at least one chemotherapeutic agent disclosed herein.

In certain embodiments, the at least one chemotherapeutic agent is selected from topoisomerase I inhibitors, and alkylating agents, and combinations thereof.

In certain embodiments, the composition comprises two chemotherapeutic agents. In certain embodiments, the two chemotherapeutic agents are a topoisomerase I inhibitor, and an alkylating agent. In certain embodiments, the topoisomerase I inhibitor is irinotecan. In certain embodiments, the alkylating agent is temozolomide.

In certain embodiments, the composition is for treating neuroblastoma. In certain embodiments, the neuroblastoma is refractory neuroblastoma, relapsed neuroblastoma, or relapsed and refractory neuroblastoma.

In certain embodiments, the composition is a pharmaceutical composition that further comprises a pharmaceutically acceptable carrier. In certain embodiments, the composition is for use in treating neuroblastoma.

In another aspect, the present disclosure provides use of the composition disclosed herein in the manufacture of a medicament for treating neuroblastoma.

DETAILED DESCRIPTION OF THE INVENTION

The present disclosure provides methods of treating neuroblastoma by the administration of an anti-GD2 antibody in combination with at least one chemotherapeutic agent and at least one hematopoietic growth factor. In particular, the present disclosure relates to treatments of refractory and relapsed neuroblastomas. The present disclosure also provides pharmaceutical compositions and dosing regimens for treating neuroblastomas.

Non-limiting embodiments of the present disclosure are described by the present specification and Examples.

For purposes of clarity of disclosure and not by way of limitation, the detailed description is divided into the following subsections:

1. Definitions;
2. Combination Therapy;
3. Methods of Treatment; and
4. Pharmaceutical Compositions and Dosage Forms

1. Definitions

The terms used in this specification generally have their ordinary meanings in the art, within the context of this present disclosure and in the specific context where each term is used. Certain terms are discussed below, or elsewhere in the specification, to provide additional guidance to the practitioner in describing the compositions and methods of the present disclosure and how to make and use them.

As used herein, the use of the word "a" or "an" when used in conjunction with the term "comprising" in the claims and/or the specification may mean "one," but it is also consistent with the meaning of "one or more," "at least one," and "one or more than one." Still further, the terms "having," "including," "containing" and "comprising" are interchangeable and one of skill in the art is cognizant that these terms are open ended terms.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value.

As used herein, the term "antibody" means not only intact antibody molecules, but also fragments of antibody molecules that retain immunogen-binding ability. Such fragments are also well known in the art and are regularly employed both in vitro and in vivo. Accordingly, as used herein, the term "antibody" means not only intact immunoglobulin molecules but also the well-known active fragments F(ab')$_2$, and Fab. F(ab')$_2$, and Fab fragments that lack the Fc fragment of intact antibody, clear more rapidly from the circulation, and may have less non-specific tissue binding of an intact antibody (Wahl et al., *J Nucl. Med.* 24:316-325 (1983)). The antibodies of the present disclosure comprise whole native antibodies, bispecific antibodies; chimeric antibodies; Fab, Fab', single chain V region fragments (scFv), fusion polypeptides, and unconventional antibodies. In certain embodiments, an antibody is a glycoprotein comprising at least two heavy (H) chains and two light (L) chains inter-connected by disulfide bonds. Each heavy chain is comprised of a heavy chain variable region (abbreviated herein as $V_H$) and a heavy chain constant ($C_H$) region. The heavy chain constant region is comprised of three domains, CH1, CH2 and CH3. Each light chain is comprised of a light chain variable region (abbreviated herein as $V_L$) and a light chain constant $C_L$ region. The light chain constant region is comprised of one domain, $C_L$. The $V_H$ and $V_L$ regions can be further sub-divided into regions of hypervariability, termed complementarity determining regions (CDR), interspersed with regions that are more conserved, termed framework regions (FR). Each $V_H$ and $V_L$ is composed of three CDRs and four FRs arranged from amino-terminus to carboxy-terminus in the following order: FR1, CDR1, FR2, CDR2, FR3, CDR3, FR4. The variable regions of the heavy and light chains contain a binding domain that interacts with an antigen. The constant regions of the antibodies may mediate the binding of the immunoglobulin to host tissues or factors, including various cells of the immune system (e.g., effector cells) and the first component (C1 q) of the classical complement system.

As used herein interchangeably, the terms "antigen-binding portion", "antigen-binding fragment", or "antigen-binding region" of an antibody, refer to the region or portion of an antibody that binds to the antigen and which confers antigen specificity to the antibody; fragments of antigen-binding proteins, for example, antibodies includes one or more fragments of an antibody that retain the ability to specifically bind to an antigen (e.g., an peptide/HLA complex). It has been shown that the antigen-binding function of an antibody can be performed by fragments of a full-length antibody. Examples of antigen-binding portions encompassed within the term "antibody fragments" of an antibody include a Fab fragment, a monovalent fragment consisting of the $V_L$, $V_H$, $C_L$ and CH1 domains; a F(ab)$_2$ fragment, a bivalent fragment comprising two Fab fragments linked by a disulfide bridge at the hinge region; a Fd fragment consisting of the $V_H$ and CH1 domains; a Fv fragment consisting of the $V_L$ and $V_H$ domains of a single arm of an antibody; a dAb fragment (Ward et al., 1989 Nature 341:544-546), which consists of a $V_H$ domain; and an isolated complementarity determining region (CDR).

"CDRs" are defined as the complementarity determining region amino acid sequences of an antibody which are the hypervariable regions of immunoglobulin heavy and light chains. See, e.g., Kabat et al., Sequences of Proteins of Immunological Interest, 4th U.S. Department of Health and Human Services, National Institutes of Health (1987). The term "hypervariable region" or "HVR" as used herein refers to each of the regions of an antibody variable domain which are hypervariable in sequence ("complementarity determining regions" or "CDRs") and/or form structurally defined loops ("hypervariable loops") and/or contain the antigen-contacting residues ("antigen contacts"). Generally, antibodies comprise three heavy chain and three light chain CDRs or CDR regions in the variable region. CDRs provide the majority of contact residues for the binding of the antibody to the antigen or epitope. In certain embodiments, the CDRs (CDR1, CDR2 and CDR3) are determined by the Kabat method.

Furthermore, although the two domains of the Fv fragment, $V_L$ and $V_H$, are coded for by separate genes, they can be joined, using recombinant methods, by a synthetic linker that enables them to be made as a single protein chain in which the $V_L$ and $V_H$ regions pair to form monovalent molecules. These are known as single chain Fv (scFv); see e.g., Bird et al., 1988 Science 242:423-426; and Huston et al., 1988 Proc. Natl. Acad. Sci. 85:5879-5883. These antibody fragments are obtained using conventional techniques known to those of ordinary skill in the art, and the fragments are screened for utility in the same manner as are intact antibodies.

As used herein, the term "isotype" refers to the antibody class that is encoded by heavy chain constant region genes. Heavy chains are classified as gamma, mu, alpha, delta, or epsilon, and define the antibody's isotype as IgG, IgM, IgA, IgD and IgE, respectively. Additional structural variations characterize distinct subtypes of IgG (e.g., IgG1, IgG2, IgG3 and IgG4) and IgA (e.g., IgA1 and IgA2). In certain embodiments, the anti-GD2 antibody is an IgG antibody. In certain embodiments, the anti-GD2 antibody is an IgG1 antibody. In certain embodiments, the anti-GD2 antibody is an IgG4 antibody.

As used herein, an antibody that "specifically binds to GD2" refers to an antibody that binds to GD2 (e.g., human GD2) with a $K_d$ of $5\times10^{-7}$ M or less, $1\times10^{-7}$ M or less, $5\times10^{-8}$ M or less, $1\times10^{-8}$ M or less, $5\times10^{-9}$ M or less, $1\times10^{-9}$ M or less, $5\times10^{-10}$ M or less, $1\times10^{-10}$ M or less, $5\times10^{-11}$ M or less or $1\times10^{-11}$ M or less.

Sequence homology or sequence identity is typically measured using sequence analysis software (for example, Sequence Analysis Software Package of the Genetics Computer Group, University of Wisconsin Biotechnology Center, 1710 University Avenue, Madison, Wis. 53705, BLAST, BESTFIT, GAP, or PILEUP/PRETTYBOX programs). Such software matches identical or similar sequences by assigning degrees of homology to various substitutions, deletions, and/or other modifications. In an exemplary approach to determining the degree of identity, a BLAST program may be used, with a probability score between $e^{-3}$ and $e^{-100}$ indicating a closely related sequence.

As used herein, the term "epitope" refers to the region of an antigen or antigens that interacts with an antibody. An epitope of a peptide or protein or sugar antigen can be linear or conformational or can be formed by contiguous or noncontiguous amino acid and/or sugar sequences of the antigen. The GD2 molecule, like many carbohydrates, contain many epitopes.

An "effective amount" of an agent refers to an amount effective, at dosages and for periods of time necessary, to achieve the desired therapeutic or prophylactic result, e.g., treating neuroblastoma.

As used herein, the term "in combination" refers to the use of more than one therapeutic agent. The use of the term "in combination" does not restrict the order in which the therapeutic agents are administered to a subject. A first therapeutic agent can be administered prior to (e.g., about 5 minutes, about 15 minutes, about 30 minutes, about 45 minutes, about 1 hour, about 2 hours, about 4 hours, about 6 hours, about 12 hours, about 24 hours, about 48 hours, about 72 hours, about 96 hours, about 1 week, about 2 weeks, about 3 weeks, about 4 weeks, about 5 weeks, about 6 weeks, about 7 weeks, about 8 weeks, about 9 weeks, about 10 weeks, about 11 weeks, or about 12 weeks before), concomitantly with, or subsequent to (e.g., about 5 minutes, about 15 minutes, about 30 minutes, about 45 minutes, about 1 hour, about 2 hours, about 4 hours, about 6 hours, about 12 hours, about 24 hours, about 48 hours, about 72 hours, about 96 hours, about 1 week, about 2 weeks, about 3 weeks, about 4 weeks, about 5 weeks, about 6 weeks, about 7 weeks, about 8 weeks, about 9 weeks, about 10 weeks, about 11 weeks, or about 12 weeks after) the administration of a second therapeutic agent to a subject.

As used herein, the term "chemotherapeutic agent" refers to a molecule (e.g., a chemical agent) that is used in chemotherapy (e.g., for treating cancer). Non-limiting examples of chemotherapeutic agents include topoisomerase I inhibitors, and alkylating agents.

As used herein, the term "topoisomerase I inhibitor" refers to an agent that interferes with the action of a topoisomerase I enzyme.

As used herein, the term "alkylating agent" refers to an agent that is capable of forming highly reactive intermediate compounds that transfer alkyl groups to DNA thereby inhibiting the growth of cancer cells.

A "subject", as referred to herein, may be a human or non-human subject, such as, but not limited to, a non-human primate, a dog, a cat, a horse, a rodent, a rabbit, etc. An adult human subject is a subject that has attained an age of at least 18 years or at least 20 years. An adult non-human subject is a subject that has attained sexual maturity. A human subject that is not an adult is a pediatric subject.

As used herein, "treatment" (and grammatical variations thereof such as "treat" or "treating") refers to clinical intervention in an attempt to alter the natural course of the individual being treated and can be performed either for prophylaxis or during the course of clinical pathology. Desirable effects of treatment include, but are not limited to, prolonging survival, preventing recurrence of disease, alleviation of symptoms, diminishment of any direct or indirect pathological consequences of the disease, preventing metastasis, decreasing the rate of disease progression, amelioration or palliation of the disease state, and remission or improved prognosis. In certain embodiments, antibodies of the presently disclosed subject matter are used to delay development of a disease or to slow the progression of a disease, e.g., a neuroblastoma.

2. Combination Therapy

The presently disclosed subject matter provides a combination therapy for treating neuroblastoma (e.g., relapsed neuroblastoma, and refractory neuroblastoma). In certain embodiments, the combination therapy comprises an anti-GD2 antibody or an antigen-binding fragment thereof, at least one hematopoietic growth factor, and at least one (e.g., two) chemotherapeutic agent).

2.1 Anti-GD2 Antibodies

GD2 is a tumor associated antigen highly expressed in neuroblastomas, and with highly restricted expression in normal tissues. This expression profile makes anti-GD2 monoclonal antibodies suitable for immunotherapy. Two anti-GD2 antibody families, 3F8 (Cheung et al., *Cancer Res* (1985); 45, 2642-9) and 14.18 (Mujoo et al., *Cancer Res* (1989); 49, 2857-61) have been tested clinically for treating neuroblastoma.

In certain embodiments, the anti-GD2 antibody is a humanized antibody, a chimeric antibody, a murine antibody, or a human antibody.

In certain embodiments, the anti-GD2 antibody or antigen-binding fragment thereof is not a 14.18 antibody. In certain embodiments, the anti-GD2 antibody or an antigen-binding fragment thereof is a 3F8 antibody or an antigen-binding fragment thereof. In certain embodiments, the anti-GD2 antibody is a chimeric 3F8 (ch3F8) or an antigen-binding fragment thereof, or a humanized 3F8 (hu3F8) antibody or an antigen-binding fragment thereof disclosed in U.S. Pat. Nos. 9,315,585, 9,688,772, and 10,287,365 and International Patent Publication No. WO2011/160119, all of which are incorporated by reference in their entireties. Non-limiting examples of chimeric and humanized 3F8 antibodies include ch3F8-IgG1, ch3F8-IgG4, hu3F8-H1L1-IgG1, hu3F8-H2L2-IgG1, hu3F8-H1L2-IgG1, hu3F8-H2L1-IgG1, hu3F8-IgG4, hu3F8IgG1n, hu3F8-IgG1-DEL, hu3F8H1L1S (hu3F8-IgG1 light chain interface enhanced), hu3F8H3L3 (hu3F8-IgG1 heavy and light chain stability enhanced), hu3F8H3L3S (interface and stability enhanced), hu3F8H1-I-gamma-1 (hu3F8-IgG1 affinity enhanced), hu3F8H3-I-gamma-1 (hu3F8-IgG1 stability and affinity enhanced) as well as fragments and regions thereof.

In certain embodiments, the anti-GD2 antibody or an antigen-binding fragment thereof is a chimeric 3F8 antibody or an antigen-binding fragment thereof. In certain embodiments, the chimeric 3F8 antibody or antigen-binding fragment thereof comprises a heavy chain variable region comprising a CDR1 domain, a CDR2 domain, and a CDR3 domain. In certain embodiments, the heavy chain variable region CDR1, CDR2 and CDR2 of the chimeric 3F8 antibody or antigen-binding fragment thereof comprise amino acid residues 31-35 of SEQ ID NO: 1 or a conservative modification thereof, amino acid residues 50-64 of SEQ ID NO: 1 or a conservative modification thereof, and amino acid residues 98-108 of SEQ ID NO: 1 or a conservative modification thereof, respectively. In certain embodiments, the heavy chain variable region of the chimeric 3F8 antibody or antigen-binding fragment thereof comprises an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO:1. In certain embodiments, the heavy chain variable region of the chimeric 3F8 antibody or antigen-binding fragment thereof comprises the amino acid sequence set forth in SEQ ID NO:1.

In certain embodiments, the heavy chain variable region of the chimeric 3F8 antibody or antigen-binding fragment thereof comprises an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO:3. In certain embodiments, the heavy chain variable region of the chimeric 3F8 antibody or antigen-binding fragment thereof comprises the amino acid sequence set forth in SEQ ID NO:3.

In certain embodiments, the light chain variable region CDR1, CDR2, and CDR3 of the chimeric 3F8 antibody or antigen-binding fragment thereof comprise amino acid residues 24-34 of SEQ ID NO: 2 or a conservative modification thereof, amino acid residues 50-56 of SEQ ID NO: 2 or a conservative modification thereof, and amino acid residues 89-95 of SEQ ID NO:2 or a conservative modification thereof, respectively. In certain embodiments, the light chain variable region of the chimeric 3F8 antibody or antigen-binding fragment thereof comprises an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO:2. In certain embodiments, the light chain variable region of the chimeric 3F8 antibody or antigen-binding fragment thereof comprises the amino acid sequence set forth in SEQ ID NO:2.

In certain embodiments, the chimeric 3F8 antibody or antigen-binding fragment thereof comprises a heavy chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO:1, and a light chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO:2. In certain embodiments, the chimeric 3F8 antibody or antigen-binding fragment thereof comprises a heavy chain variable region comprising the amino acid sequence set forth in SEQ ID NO:1, and a light chain variable region comprising the amino acid sequence set forth in SEQ ID NO:2. In certain embodiments, the chimeric 3F8 antibody is ch3F8-IgG1 disclosed in U.S. Pat. No. 9,315,585.

In certain embodiment, the chimeric 3F8 antibody or antigen-binding fragment thereof comprises a heavy chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO:3, and a light chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO:2. In certain embodiment, the chimeric 3F8 antibody or antigen-binding fragment thereof comprises a heavy chain variable region comprising the amino acid sequence set forth in SEQ ID NO:3, and a light chain variable region comprising the amino acid sequence set forth in SEQ ID NO:2. In certain embodiments, the chimeric 3F8 antibody is ch3F8-IgG4 disclosed in U.S. Pat. No. 9,315,585.

In certain embodiments, the heavy chain variable region of the chimeric 3F8 antibody comprises a framework regions (FR) 1 (FR1), 2 (FR2), 3 (FR3) and 4 (FR4), wherein the heavy chain FR1, FR2, FR3 and FR4 comprise amino acid residues 1-30 of SEQ ID NO:1 or a conservative modification thereof, amino acid residues 36-49 of SEQ ID NO:1 or a conservative modification thereof, amino acid residues 65-97 of SEQ ID NO:1 or a conservative modification thereof, and amino acid residues 109-120 of SEQ ID NO:1 or a conservative modification thereof, respectively. In certain embodiments, the light chain variable region of the chimeric 3F8 antibody comprises a FR1, FR2, FR3 and FR4, wherein the light chain FR1, FR2, FR3, and FR4 comprise amino acid residues 1-23 of SEQ ID NO:2 or a conservative modification thereof, amino acid residues 35-49 of SEQ ID NO:2 or a conservative modification thereof, amino acid residues 57-88 of SEQ ID NO:2 or a conservative modification thereof, and amino acid residues 96-108 of SEQ ID NO:2 or a conservative modification thereof, respectively.

In certain embodiments, the anti-GD2 antibody or antigen-binding fragment thereof is a humanized 3F8 antibody ("hu3F8 antibody") or an antigen-binding fragment thereof.

In certain embodiments, the humanized 3F8 antibody or antigen-binding fragment thereof comprises a heavy chain variable region comprising a CDR1 domain, a CDR2 domain, and a CDR3 domain. In certain embodiments, the heavy chain variable region CDR1, CDR2 and CDR3 of the humanized 3F8 antibody or antigen-binding fragment thereof comprise amino acid residues 31-35 of SEQ ID NO: 4 or a conservative modification thereof, amino acid residues 50-64 or 50-65 of SEQ ID NO: 4 or a conservative modification thereof, and amino acid residues 98-108 of SEQ ID NO: 4 or a conservative modification thereof, respectively. In certain embodiments, the heavy chain variable region of the hu3F8 antibody or antigen-binding fragment thereof comprises an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO:4. In certain embodiments, the heavy chain variable region of the hu3F8 antibody or antigen-binding fragment thereof comprises the amino acid sequence set forth in SEQ ID NO:4.

In certain embodiments, the heavy chain variable region CDR1, CDR2 and CDR3 of the humanized 3F8 antibody or antigen-binding fragment thereof comprise amino acid residues 31-35 of SEQ ID NO: 6 or a conservative modification thereof, amino acid residues 50-64 of SEQ ID NO: 6 or a conservative modification thereof, and amino acid residues 98-108 of SEQ ID NO: 6 or a conservative modification thereof, respectively. In certain embodiments, the heavy chain variable region of the humanized 3F8 antibody or antigen-binding fragment thereof comprises an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO:6. In certain embodiments, the heavy chain variable region of the humanized 3F8 antibody or antigen-binding fragment thereof comprises the amino acid sequence set forth in SEQ ID NO:6.

In certain embodiments, the heavy chain variable region CDR1, CDR2 and CDR3 of the humanized 3F8 antibody or antigen-binding fragment thereof comprise amino acid residues 31-35 of SEQ ID NO: 8 or a conservative modification thereof, amino acid residues 50-64 of SEQ ID NO: 8 or a conservative modification thereof, and amino acid residues 98-108 of SEQ ID NO: 8 or a conservative modification thereof, respectively. In certain embodiments, the heavy chain variable region of the humanized 3F8 antibody or antigen-binding fragment thereof comprises an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO:8. In certain embodiments, the heavy chain variable region of the humanized 3F8 antibody or antigen-binding fragment thereof comprises the amino acid sequence set forth in SEQ ID NO:8.

In certain embodiments, the heavy chain variable region CDR1, CDR2 and CDR3 of the humanized 3F8 antibody or antigen-binding fragment thereof comprise amino acid residues 31 to 35 of SEQ ID NO: 11 or a conservative modification thereof, amino acid residues 50 to 65 of SEQ ID NO: 11 or a conservative modification thereof, and amino acid residues 98 to 108 of SEQ ID NO: 11 or a conservative modification thereof, respectively. In certain embodiments, the heavy chain variable region of the humanized 3F8 antibody or antigen-binding fragment thereof comprises an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO: 11. In certain embodiments, the heavy chain variable region of the humanized 3F8 antibody or antigen-binding fragment thereof comprises the amino acid sequence set forth in SEQ ID NO: 11.

In certain embodiments, the humanized 3F8 antibody or antigen-binding fragment thereof comprises a light chain variable region comprising a CDR1 domain, a CDR2 domain, and a CDR3 domain. In certain embodiments, the light chain variable region CDR1, CDR2 and CDR3 of the humanized 3F8 antibody or antigen-binding fragment thereof comprise amino acid residues 24-34 of SEQ ID NO: 5 or a conservative modification thereof, amino acid residues 50-56 of SEQ ID NO: 5 or a conservative modification thereof, and amino acid residues 89-95 of SEQ ID NO: 5 or a conservative modification thereof, respectively. In certain embodiments, the light chain variable region CDR1, CDR2 and CDR3 of the humanized 3F8 antibody or antigen-binding fragment thereof comprise amino acid residues 24-34 of SEQ ID NO: 5 or a conservative modification thereof, amino acid residues 50-56 of SEQ ID NO: 5 or a conservative modification thereof, and amino acid residues 89-94 of SEQ ID NO: 5 or a conservative modification thereof, respectively. In certain embodiments, the light chain variable region of the humanized 3F8 antibody or antigen-binding fragment thereof comprises an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO:5. In certain embodiments, the light chain variable region of the humanized 3F8 antibody or antigen-binding fragment thereof comprises the amino acid sequence set forth in SEQ ID NO:5.

In certain embodiments, the humanized 3F8 antibody or antigen-binding fragment thereof comprises a light chain variable region comprising a CDR1 domain, a CDR2 domain, and a CDR3 domain. In certain embodiments, the light chain variable region CDR1, CDR2 and CDR3 of the humanized 3F8 antibody or antigen-binding fragment thereof comprise amino acid residues 24-34 of SEQ ID NO: 7 or a conservative modification thereof, amino acid residues 50-56 of SEQ ID NO: 7 or a conservative modification thereof, and amino acid residues 89-95 of SEQ ID NO: 7 or a conservative modification thereof, respectively. In certain embodiments, the light chain variable region of the humanized 3F8 antibody or antigen-binding fragment thereof comprises an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO:7. In certain embodiments, the light chain variable region of the humanized 3F8 antibody or antigen-binding fragment thereof comprises the amino acid sequence set forth in SEQ ID NO:7.

In certain embodiments, the humanized 3F8 antibody or antigen-binding fragment thereof comprises a heavy chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO:4, and a light chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO:5. In certain embodiments, the humanized 3F8 antibody or antigen-binding fragment thereof comprises a heavy chain variable region comprising the amino acid sequence set forth in SEQ ID NO:4, and a light chain variable region comprising the amino acid sequence set forth in SEQ ID NO:5. In certain embodiments, the humanized 3F8 antibody is hu3F8-H1L1-IgG1 disclosed in U.S. Pat. No. 9,315,585.

In certain embodiments, the humanized 3F8 antibody or antigen-binding fragment thereof comprises a heavy chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO:6, and a light chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO:5. In certain embodiments, the humanized 3F8 antibody or antigen-binding fragment thereof comprises a heavy chain variable region comprising the amino acid sequence set forth in SEQ ID NO:6, and a light chain variable region comprising the amino acid sequence set forth in SEQ ID NO:5.

In certain embodiments, the humanized 3F8 antibody or antigen-binding fragment thereof comprises a heavy chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO: 6, and a light chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO: 7. In certain embodiments, the humanized 3F8 antibody or antigen-binding fragment thereof comprises a heavy chain variable region comprising the amino acid sequence set forth in SEQ ID NO: 6, and a light chain variable region comprising the amino acid sequence set forth in SEQ ID NO: 7. In certain embodiments, the humanized 3F8 antibody is hu3F8-H2L2-IgG1 disclosed in U.S. Pat. No. 9,315,585.

In certain embodiments, the humanized 3F8 antibody or antigen-binding fragment thereof comprises a heavy chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO: 8, and a light chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO: 5. In certain embodiments, the humanized 3F8 antibody or antigen-binding fragment thereof comprises a heavy chain variable region comprising the amino acid sequence set forth in SEQ ID NO: 8, and a light chain variable region comprising the amino acid sequence set forth in SEQ ID NO: 5. In certain embodiments, the humanized 3F8 antibody is hu3F8-H1L1-IgG4 disclosed in U.S. Pat. No. 9,315,585.

In certain embodiments, the humanized 3F8 antibody or antigen-binding fragment thereof comprises a heavy chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO: 8, and a light chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO: 7. In certain embodiments, the humanized 3F8 antibody or antigen-binding fragment thereof comprises a heavy chain variable region comprising the amino acid sequence set forth in SEQ ID NO: 8, and a light chain variable region comprising the amino acid sequence set forth in SEQ ID NO: 7.

In certain embodiments, the humanized 3F8 antibody or antigen-binding fragment thereof comprises a heavy chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO: 11, and a light chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO: 5. In certain embodiments, the humanized 3F8 antibody or antigen-binding fragment thereof comprises a heavy chain variable region comprising the amino acid sequence set forth in SEQ ID NO: 11, and a light chain variable region comprising the amino acid sequence set forth in SEQ ID NO: 5.

In certain embodiments, the humanized 3F8 antibody is a hu3F8 engineered with modified carbohydrate composition with increased effector function. In certain embodiments, the humanized 3F8 antibody is hu3F8-IgG1n disclosed in U.S. Pat. No. 9,315,585. In certain embodiments, the humanized 3F8 antibody comprises a triple mutation DEL in the heavy chain variable region. In certain embodiments, the humanized 3F8 antibody is hu3F8-IgG1-DEL or hu3F8-IgG1n disclosed in U.S. Pat. No. 9,315,585. In certain embodiments, triple mutation DEL consists of substitutions S239D, A330L and I332E of SEQ ID NO: 4, 6, or 8 at the heavy chain variable region.

In certain embodiments, the humanized 3F8 antibody is derived from computational analysis of the crystal structure and adjustment of the amino acid sequence by backmutation and forward mutation to enhance stability of the antibody. In certain embodiments, the humanized 3F8 antibody or antigen-binding fragment thereof comprises a heavy chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO:9, and/or a light chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO:10. In certain embodiments, the humanized 3F8 antibody comprises a heavy chain variable region comprising the amino acid sequence set forth in SEQ ID NO:9, and/or a light chain variable region comprising the amino acid sequence set forth in SEQ ID NO:10. In certain embodiments, the humanized 3F8 antibody comprises a heavy chain variable region comprising the amino acid sequence set forth in SEQ ID NO:9, and a light chain variable region comprising the amino acid sequence set forth in SEQ ID NO:10. In certain embodiments, the humanized 3F8 antibody is a hu3F8H3L3 disclosed in U.S. Pat. No. 9,315,585.

In certain embodiments, the light chain variable region of the humanized 3F8 antibody comprises an additional mutation to enhance stability at the heavy chain variable region and light chain variable region interface. In certain embodiments, the additional mutation is a substitution Ala43Ser of SEQ ID NO: 10. In certain embodiments, the additional mutation is a substitution Ala43Ser of SEQ ID NO: 5. In certain embodiments, the additional mutation is a substitution Ala43Ser of SEQ ID NO: 7.

Computational modeling further showed that substitution of the Gly at position 54 to Ile in the heavy chain CDR3 domain of the can change the shape of the binding pocket and increase the contact with the GD2 ligand. In certain embodiments, the heavy chain variable region comprises a Gly54Ile substitution in SEQ ID NO: 4. In certain embodiments, the heavy chain variable region comprises a Gly54Ile substitution in SEQ ID NO: 6. In certain embodiments, the heavy chain variable region comprises a Gly54Ile substitution in SEQ ID NO: 8. In certain embodiments, the heavy chain variable region comprises a Gly54Ile substitution in SEQ ID NO:9.

In certain embodiments, the 3F8 antibody is an IgG1 antibody. In certain embodiments, the 3F8 antibody is an IgG4 antibody. SEQ ID Nos.: 1-11 are provided below:

(Seq ID NO: 1)
QVQLKESGPGLVAPSQSLSITCTVSGFSVTNYGVHWVRQPPGKGLEWLG
VIWAGGITNYNSAFMSRLSISKDNSKSQVFLKMNSLQIDDTAMYYCASR
GGHYGYALDYWGQGTSVTVSSASTKGPSVFPLAPSSKSTSGGTAALGCL
VKDYFPEPVTVSWNSGALTSGVHTFPAVLQSSGLYSLSSVVTVPSSSLG
TQTYICNVNHKPSNTKVDKRVEPKSCDKTHTCPPCPAPELLGGPSVFLF
PPKPKDTLMISRTPEVTCVVVDVSHEDPEVKENWYVDGVEVHNAKTKPR
EEQYNSTYRVVSVLTVLHQDWLNGKEYKCKVSNKALPAPIEKTISKAKG
QPREPQVYTLPPSRDELTKNQVSLTCLVKGFYPSDIAVEWESNGQPENN
YKTTPPVLDSDGSFFLYSKLTVDKSRWQQGNVFSCSVMHEALHNHYTQK
SLSLSPGK (Seq ID NO: 2)
SIVMTQTPKFLLVSAGDRVTITCKASQSVSNDVTWYQQKAGQSPKLLIY
SASNRYSGVPDRFTGSGYGTAFTFTISTVQAEDLAVYFCQQDYSSEGGG
TKLEIKRTVAAPSVFIFPPSDEQLKSGTASVVCLLNNFYPREAKVQWKV
DNALQSGNSQESVTEQDSKDSTYSLSSTLTLSKADYEKHKVYACEVTHQ
GLSSPVTKSENRGEC (Seq ID NO: 3)
QVQLKESGPGLVAPSQSLSITCTVSGFSVTNYGVHWVRQPPGKGLEWLG
VIWAGGITNYNSAFMSRLSISKDNSKSQVFLKMNSLQIDDTAMYYCASR
GGHYGYALDYWGQGTSVTVSSASTKGPSVFPLAPCSRSTSESTAALGCL
VKDYFPEPVTVSWNSGALTSGVHTFPAVLQSSGLYSLSSVVTVPSSSLG
TKTYTCNVDHKPSNTKVDKRVESKYGPPCPSCPAPEFLGGPSVELFPPK
PKDTLMISRTPEVTCVVVDVSQEDPEVQFNWYVDGVEVHNAKTKPREEQ
ENSTYRVVSVLTVLHQDWLNGKEYKCKVSNKGLPSSIEKTISKAKGQPR
EPQVYTLPPSQEEMTKNQVSLTCLVKGFYPSDIAVEWESNGQPENNYKT
TPPVLDSDGSFFLYSRLTVDKSRWQEGNVFSCSVMHEALHNHYTQKSLS
LSLGK (Seq ID NO: 4)
QVQLVESGPGVVQPGRSLRISCAVSGFSVTNYGVHWVRQPPGKGLEWLG
VIWAGGITNYNSAFMSRLTISKDNSKNTVYLQMNSLRAEDTAMYYCASR
GGHYGYALDYWGQGTLVTVSSASTKGPSVFPLAPSSKSTSGGTAALGCL
VKDYFPEPVTVSWNSGALTSGVHTFPAVLQSSGLYSLSSVVTVPSSSLG
TQTYICNVNHKPSNTKVDKRVEPKSCDKTHTCPPCPAPELLGGPSVFLF
PPKPKDTLMISRTPEVTCVVVDVSHEDPEVKENWYVDGVEVHNAKTKPR
EEQYNSTYRVVSVLTVLHQDWLNGKEYKCKVSNKALPAPIEKTISKAKG
QPREPQVYTLPPSRDELTKNQVSLTCLVKGFYPSDIAVEWESNGQPENN
YKTTPPVLDSDGSFFLYSKLTVDKSRWQQGNVFSCSVMHEALHNHYTQK
SLSLSPG (Seq ID NO: 5)
EIVMTQTPATLSVSAGERVTITCKASQSVSNDVTWYQQKPGQAPRLLIY
SASNRYSGVPARFSGSGYGTEFTFTISSVQSEDFAVYFCQQDYSSEGQG
TKLEIKRTVAAPSVFIFPPSDEQLKSGTASVVCLLNNFYPREAKVQWKV
DNALQSGNSQESVTEQDSKDSTYSLSSTLTLSKADYEKHKVYACEVTHQ
GLSSPVTKSENRGEC (Seq ID NO: 6)
QVQLKESGPGVVQPGQSLSISCAVSGFSVTNYGVHWVRQPPGKGLEWLG
VIWAGGITNYNSAFMSRLTISKDNSKSTVYLKMNSLQAEDTAMYYCASR
GGHYGYALDYWGQGTLVTVSSASTKGPSVFPLAPSSKSTSGGTAALGCL
VKDYFPEPVTVSWNSGALTSGVHTFPAVLQSSGLYSLSSVVTVPSSSLG
TQTYICNVNHKPSNTKVDKRVEPKSCDKTHTCPPCPAPELLGGPSVFLF
PPKPKDTLMISRTPEVTCVVVDVSHEDPEVKENWYVDGVEVHNAKTKPR
EEQYNSTYRVVSVLTVLHQDWLNGKEYKCKVSNKALPAPIEKTISKAKG
QPREPQVYTLPPSRDELTKNQVSLTCLVKGFYPSDIAVEWESNGQPENN
YKTTPPVLDSDGSFFLYSKLTVDKSRWQQGNVFSCSVMHEALHNHYTQK
SLSLSPG (Seq ID NO: 7)
SIVMTQTPKTLSVSAGERVTITCKASQSVSNDVTWYQQKPGQSPKLLIY
SASNRYSGVPDRFSGSGYGTAFTFTISSVQAEDFAVYFCQQDYSSFGQG
TKLEIKRTVAAPSVFIFPPSDEQLKSGTASVVCLLNNFYPREAKVQWKV
DNALQSGNSQESVTEQDSKDSTYSLSSTLTLSKADYEKHKVYACEVTHQ
GLSSPVTKSENRGEC (Seq ID NO: 8)
QVQLVESGPGVVQPGRSLRISCAVSGFSVTNYGVHWVRQPPGKGLEWLG
VIWAGGITNYNSAFMSRLTISKDNSKNTVYLQMNSLRAEDTAMYYCASR
GGHYGYALDYWGQGTLVTVSSASTKGPSVFPLAPCSRSTSESTAALGCL
VKDYFPEPVTVSWNSGALTSGVHTEPAVLQSSGLYSLSSVVTVPSSSLG
TKTYTCNVDHKPSNTKVDKRVESKYGPPCPSCPAPEFLGGPSVELFPPK
PKDTLMISRTPEVTCVVVDVSQEDPEVQFNWYVDGVEVHNAKTKPREEQ
ENSTYRVVSVLTVLHQDWLNGKEYKCKVSNKGLPSSIEKTISKAKGQPR
EPQVYTLPPSQEEMTKNQVSLTCLVKGFYPSDIAVEWESNGQPENNYKT
TPPVLDSDGSFFLYSRLTVDKSRWQEGNVFSCSVMHEALHNHYTQKSLS
LSLGK (Seq ID NO: 9)
QVQLVESGPGLVQPGRSLRLTCAVSGFSVTNYGVHWVRQPPGKGLEWLG
VIWAGGITNYNSAFMSRLTISKDNSKNTVYLQMNSLRAEDTAVYYCASR
GGHYGYALDYWGQGTLVTVSSASTKGPSVFPLAPSSKSTSGGTAALGCL
VKDYFPEPVTVSWNSGALTSGVHTFPAVLQSSGLYSLSSVVTVPSSSLG
TQTYICNVNHKPSNTKVDKRVEPKSCDKTHTCPPCPAPELLGGPSVFLF

-continued

PPKPKDTLMISRTPEVTCVVVDVSHEDPEVKENWYVDGVEVHNAKTKPR

EEQYNSTYRVVSVLTVLHQDWLNGKEYKCKVSNKALPAPIEKTISKAKG

QPREPQVYTLPPSRDELTKNQVSLTCLVKGFYPSDIAVEWESNGQPENN

YKTTPPVLDSDGSFFLYSKLTVDKSRWQQGNVFSCSVMHEALHNHYTQK

SLSLSPGK (Seq ID NO: 10)
SIVMTQTPAFLLVSAGERVTITCRASQSVSNDVTWYQQKAGQAPRLLIY

SASNRYTGIPARFSGSGYGTEFTFTISSVQSEDFAVYFCQQDYSSEGGG

TKLEIKRTVAAPSVFIFPPSDEQLKSGTASVVCLLNNFYPREAKVQWKV

DNALQSGNSQESVTEQDSKDSTYSLSSTLTLSKADYEKHKVYACEVTHQ

GLSSPVTKSENRGEC (SEQ ID NO: 11)
QVQLVESGPGVVQPGRSLRISCAVSGFSVTNYGVHWVRQPPGKGLEWLG

VIWAGGITNYNSAFMSRLTISKDNSKNTVYLQMNSLRAEDTAMYYCASR

GGHYGYALDYWGQGTLVTVSSASTKGPSVFPLAPSSKSTSGGTAALGCL

VKDYFPEPVTVSWNSGALTSGVHTFPAVLQSSGLYSLSSVVTVPSSSLG

TQTYICNVNHKPSNTKVDKRVEPKSCDKTHTCPPCPAPELLGGPSVFLF

PPKPKDTLMISRTPEVTCVVVDVSHEDPEVKENWYVDGVEVHNAKTKPR

EEQYNSTYRVVSVLTVLHQDWLNGKEYKCKVSNKALPAPIEKTISKAKG

QPREPQVYTLPPSRDELTKNQVSLTCLVKGFYPSDIAVEWESNGQPENN

YKTTPPVLDSDGSFFLYSKLTVDKSRWQQGNVFSCSVMHEALHNHYTQK

SLSLSPGK 2.2 Hematopoietic Growth Factors

Hematopoietic growth factors can provide a synergistic effect when administered with (e.g., before, after or simultaneously) an anti-GD2 antibody or an antigen-binding fragment thereof. The combination therapy of humanized 3F8 ("hu3F8") and granulocyte-macrophage colony-stimulating factor (GM-CSF) is being tested in phase II clinical trials. Preliminary results of the clinical trial show that responses to the combination therapy of hu3F8 and GM-CSF in secondary refractory neuroblastoma and in chemoresistant soft tissue disease are infrequent (Kushner et al., *Advances in Neuroblastoma Research* (2016):Abs 57, 2016).

Hematopoietic growth factors are biological molecules, such as naturally occurring or artificially made proteins. Hematopoietic growth factors can stimulate the survival and/or proliferation of hematopoietic precursor cells and immunologically active poietic cells, and may increase antibody-dependent cellular cytotoxicity. Non-limiting examples of hematopoietic growth factors include granulocyte colony stimulating factor (G-CSF) and granulocyte macrophage colony stimulating factor (GM-CSF). The hematopoietic growth factor can be a native, naturally occurring, recombinant, or mutated form of hematopoietic growth factor. Recombinant and mutated forms of GM-CSF or G-CSF can be prepared as described in U.S. Pat. Nos. 5,391,485; 5,393,870; 5,229,496; 4,810,643; 4,999,291; 5,528,823; and 5,580,755, all of which are incorporated herein by reference in their entireties.

The present disclosure provides the use of native, naturally occurring, and recombinant hematopoietic growth factors. The present disclosure further provides mutants and derivatives (e.g., modified forms) of naturally occurring hematopoietic growth factors that exhibit, in vivo, at least some of the pharmacological activity of the hematopoietic growth factors upon which they are based. Non-limiting examples of mutants include hematopoietic growth factors that have one or more amino acid residues that differ from the corresponding residues in the naturally occurring forms of the hematopoietic growth factors, and hematopoietic growth factors that lack carbohydrate moieties normally present in their naturally occurring forms (e.g., nonglycosylated forms). Examples of derivatives include, but are not limited to, pegylated derivatives and fusion proteins.

Hematopoietic growth factors may be administered in the form of anti-cancer vaccines. For example, vaccines that secrete, or cause the secretion of, cytokines such as G-CSF and GM-CSF can be used in the methods, pharmaceutical compositions, and kits of the present disclosure. See, e.g., Emens, L. A., et al., Curr. Opinion Mol. Ther. 3(1):77-84 (2001).

In certain embodiments, the hematopoietic growth factor is a GM-CSF. In certain embodiments, the hematopoietic growth factor is a recombinant GM-CSF. In certain embodiments, the recombinant GM-CSF is sargramostim (Leukine®).

2.3 Chemotherapeutic Agents

Chemotherapeutic agents can provide a synergistic effect when administered with (e.g., before, after or simultaneously) an anti-GD2 antibody or an antigen-binding fragment thereof.

In certain embodiments, the chemotherapeutic agent is a topoisomerase I inhibitor. Non-limiting examples of topoisomerase I inhibitors include irinotecan, topotecan, camptothecin and lamellarin D.

In certain embodiments, the topoisomerase I inhibitor is irinotecan. Irinotecan is a compound having the chemical name (S)-4,11-diethyl-4-hydroxy-3,14-dioxo-3,4,12,14-tetrahydro-1H-pyrano[3',4':6,7]indolizino[1,2-b]quinolin-9-yl [1,4'-bipiperidine]-1'-carboxylate, and having the Chemical Abstracts registry number 100286-90-6, with the molecular structure:

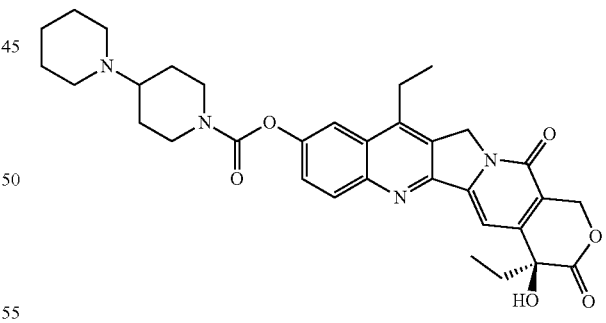

Irinotecan is a water-soluble camptothecin derivative that interrupts DNA replication by binding to the topoisomerase I enzyme responsible for cutting and re-ligating single DNA strands. Irinotecan is most effective against a particular tumor cell during the DNA synthesis phase of cell replication, making it a phase sensitive drug. Irinotecan hydrolysis by carboxylesterase-2 is responsible for its activation to SN-38 (7-ethyl-10-hydroxycamptothecin), a topoisomerase I inhibitor of much higher potency than irinotecan. The main inactivating pathway of irinotecan is the biotransformation of active SN-38 into inactive SN-38 glucuronide (SN-38G).

Irinotecan treatment is associated with significant toxicity, including severe diarrhea, myelosuppression, and neutropenia. These toxicities are likely induced by inefficient metabolism and excretion of SN-38, which undergoes glucuronidation primarily in the liver by UGT1A prior to excretion through the kidneys In certain embodiments, the chemotherapeutic agent is an alkylating agent. Non-limiting examples of alkylating agents include nitrogen mustards such as mechlorethamine (nitrogen mustard), chlorambucil, cyclophosphamide, ifosfamide, and melphalan; nitrosoureas such as streptozocin, carmustine (BCNU), and lomustine; alkyl sulfonates such as busulfan; triazines such as dacarbazine (DTIC) and temozolomide; and ethylenimines such as thiotepa and altretamine (hexamethylmelamine).

In certain embodiments, the alkylating agent is temozolomide. Temozolomide is a compound having the chemical name 3,4-dihydro-3-methyl-4-oxoimidazo[5,1-d]-as-tetrazine-8-carboxamide and having the Chemical Abstracts registry number 85622-93-1, with the molecular structure:

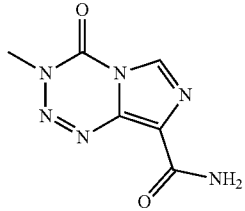

The cytotoxicity of temozolomide or metabolite of it, MTIC, is thought to be primarily due to alkylation of DNA. Alkylation (methylation) occurs mainly at the O6 and N7 positions of guanine. The dose-limiting side effects of temozolomide include hematologic toxicity, myelosuppression, anemia, and leukopenia.

In certain embodiments, the combination therapy of the presently disclosed subject matter comprises two chemotherapeutic agents. In certain embodiments, the two chemotherapeutic agents are a topoisomerase I inhibitor and an alkylating agent. In certain embodiments, the two chemotherapeutic agents are irinotecan and temozolomide (referred to as "IT").

3. Methods of Treatment

The present disclosure provides methods of treating neuroblastoma, e.g., a subject suffering from neuroblastoma. In certain embodiments, the subject has been previously treated for neuroblastoma (e.g., undergone a surgery), but non-responsive to standard therapies. In certain embodiments, the neuroblastoma is a refractory neuroblastoma. In certain embodiments, the subject has not previously been treated. In certain embodiments, the neuroblastoma is a relapsed neuroblastoma.

The present disclosure provides methods for treating neuroblastoma using the combination therapy disclosed herein. In certain embodiments, the method comprises administering to a subject an anti-GD2 antibody or an antigen-binding fragment thereof disclosed herein, at least one hematopoietic growth factor (e.g., sargramostim) disclosed herein, and at least one (e.g., two) chemotherapeutic agent (e.g., irinotecan and temozolomide) disclosed herein. In certain embodiments, the at least one chemotherapeutic agent is selected from the group consisting of topoisomerase I inhibitors, alkylating agents, and combinations thereof. In certain embodiments, the methods comprise administering an anti-GD2 antibody or an antigen-binding fragment, in combination with a hematopoietic growth factor, a topoisomerase I inhibitor, and an alkylating agent. In certain embodiments, the at least one hematopoietic growth factor is selected from the group consisting of G-CSF, GM-CSF, and a combination thereof. In certain embodiments, the hematopoietic growth factor is GM-CSF. In certain embodiments, the GM-CSF is sargramostim. In certain embodiments, the topoisomerase I inhibitor is irinotecan. In certain embodiments, the alkylating agent is temozolomide. In certain embodiments, the anti-GD2 antibody or an antigen-binding fragment thereof is a hu3F8 antibody or an antigen-binding fragment thereof. In certain embodiments, the anti-GD2 antibody is an IgG1 antibody. In certain embodiment, the anti-GD2 antibody or antigen-binding fragment thereof comprises a heavy chain variable region CDR1 comprising amino acids residues 31 to 35 of SEQ ID NO: 11 or a conservative modification thereof, a heavy chain variable region CDR2 comprising amino acids residues 50 to 65 of SEQ ID NO: 11 or a conservative modification thereof, and a heavy chain variable region CDR3 comprising amino acids residues 98 to 108 of SEQ ID NO: 11 or a conservative modification thereof. In certain embodiment, the anti-GD2 antibody or antigen-binding fragment thereof comprises a heavy chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO:11. In certain embodiment, the anti-GD2 antibody or antigen-binding fragment thereof comprises a light chain variable region CDR1 comprising amino acids residues 24 to 34 of SEQ ID NO: 5 or a conservative modification thereof, a light chain variable region CDR2 comprising amino acids residues 50 to 56 of SEQ ID NO: 5 or a conservative modification thereof, and a light chain variable region CDR3 comprising amino acids residues 89 to 95 of SEQ ID NO: 5 or a conservative modification thereof. In certain embodiment, the anti-GD2 antibody or antigen-binding fragment thereof comprises a light chain variable region CDR1 comprising amino acids residues 24 to 34 of SEQ ID NO: 5 or a conservative modification thereof, a light chain variable region CDR2 comprising amino acids residues 50 to 56 of SEQ ID NO: 5 or a conservative modification thereof, and a light chain variable region CDR3 comprising amino acids residues 89 to 94 of SEQ ID NO: 5 or a conservative modification thereof. In certain embodiment, the anti-GD2 antibody or antigen-binding fragment thereof comprises a light chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO: 5. In certain embodiment, the anti-GD2 antibody or antigen-binding fragment thereof comprises a heavy chain variable region CDR1 comprising amino acids residues 31 to 35 of SEQ ID NO: 11 or a conservative modification thereof, a heavy chain variable region CDR2 comprising amino acids residues 50 to 65 of SEQ ID NO: 11 or a conservative modification thereof, a heavy chain variable region CDR3 comprising amino acids residues 98 to 108 of SEQ ID NO: 11 or a conservative modification thereof, a light chain variable region CDR1 comprising amino acids residues 24 to 34 of SEQ ID NO: 5 or a conservative modification thereof, a light chain variable region CDR2 comprising amino acids residues 50 to 56 of SEQ ID NO: 5 or a conservative modification thereof, and a light chain variable region CDR3 comprising amino acids residues 89 to 95 of SEQ ID NO: 5 or a conservative modification thereof. In certain embodiment, the anti-GD2 antibody or antigen-binding fragment thereof comprises a heavy chain variable region CDR1 comprising amino acids residues 31 to 35 of SEQ ID NO: 11 or a conservative modification thereof, a heavy chain variable region CDR2 comprising amino acids residues 50 to 65 of SEQ ID NO: 11 or a conservative modification thereof, a heavy chain variable region CDR3 comprising amino acids residues 98 to 108 of SEQ ID NO: 11 or a conservative modification thereof, a light chain variable region CDR1 comprising amino acids residues 24 to 34 of SEQ ID NO: 5 or a conservative modification thereof, a light chain variable region CDR2 comprising amino acids residues 50 to 56 of SEQ ID NO: 5 or a conservative modification thereof, and a light chain variable region CDR3 comprising amino acids residues 89 to 94 of SEQ ID NO: 5 or a conservative modification thereof. In certain embodiment, the anti-GD2 antibody or antigen-binding fragment thereof comprises a heavy chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO:11, and a light chain variable region comprising an amino acid sequence that is at least about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98% or about 99% homologous to the amino acid sequence set forth in SEQ ID NO: 5. In certain embodiment, the anti-GD2 antibody or antigen-binding fragment thereof comprises the amino acid sequence set forth in SEQ ID NO:11 and a light chain variable region comprising the amino acid sequence set forth in SEQ ID NO:5.

In certain embodiments, the methods comprise administering an anti-GD2 antibody or an antigen-binding fragment thereof, sargramostim, irinotecan, and temozolomide, wherein the anti-GD2 antibody or antigen-binding fragment thereof comprises a heavy chain variable region comprising the amino acid sequence set forth in SEQ ID NO:11 and a light chain variable region comprising the amino acid sequence set forth in SEQ ID NO:5.

In certain embodiments, the anti-GD2 antibody or antigen-binding fragment thereof can be administered in a single or divided daily doses in an amount from about 0.10 to 50 mg/kg of subject per day. In certain embodiments, the anti-GD2 antibody or antigen-binding fragment thereof can be administered in a single or divided daily doses in an amount of about 0.1, about 0.5, about 1.0, about 2, about 2.1, about 2.2, about 2.3, about 2.4, about 2.5, about 2.6, about 2.7, about 2.8, about 2.9, about 3, about 3.5, about 4, about 4.5, about 5, about 5.5, about 6, about 6.5, about 7, about 7.5, about 8, about 8.5, about 9, about 9.5, about 10, about 15, about 20, about 25, about 30, about 35, about 40, about 45, or about 50 mg/kg of subject per day. In certain embodiments, the anti-GD2 antibody or antigen-binding fragment thereof is administered to the patient in a single daily dose in an amount from about 2 to 2.5 mg/kg of subject. In certain embodiments, the anti-GD2 antibody or antigen-binding fragment thereof is administered to the patient in a single daily dose in an amount of about 2.25 mg/kg of subject. Alternatively, the dosage administered can vary depending upon known factors, such as the pharmacodynamic characteristics of the particular agent, and its mode and route of administration; age, health, and weight of the recipient; nature and extent of symptoms, kind of concurrent treatment, frequency of treatment, and the effect desired.

The anti-GD2 antibody or antigen-binding fragment thereof can be administered to the subject in the dose disclosed herein on at least one of day 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40, or alternatively or additionally, at least one of week 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, or 52, or any combination thereof, using single, infusion or repeated doses. In certain embodiments, the anti-GD2 antibody or antigen-binding fragment thereof is administered every other day. In certain embodiments, the anti-GFD2 antibody or antigen-binding fragment thereof is administered for 4 days of a treatment cycle. In certain embodiments, the anti-GFD2 antibody or antigen-binding fragment thereof is administered on day 2, day 4, day 8, and day 10 of a treatment cycle. In certain embodiments, the during of the treatment cycle is 10 days.

The anti-GD2 antibody or antigen-binding fragment thereof can be administered by parenteral, subcutaneous, intramuscular, intravenous, intrarticular, intrabronchial, intraabdominal, intracapsular, intracartilaginous, intracavitary, intracelial, intracerebellar, intracereboventricular, intrathecal, intra-Ommaya, intraocular, intravitreous, intracolic, intracervical, intragastric, intrahepatic, intramyocardial, intraosteal, intrapelvic, intrapericardiac, intraperitoneal, intrapleural, intraprostatic, intrapulmonary, intrarectal, intrarenal, intraretinal, intraspinal, intrasynovial, intrathoracic, intrauterine, intravesical, bolus, vaginal, rectal, buccal, sublingual, intranasal, or transdermal means. In certain embodiments, the anti-GD2 antibody or antigen-binding fragment thereof is administered intravenously (IV).

In certain embodiments, the subject suffers from a refractory neuroblastoma. In certain embodiments, the subject suffers from a relapsed neuroblastoma In certain embodiments, the hematopoietic growth factor is administered in an amount of from about 1 to about 750 mg/m$^2$/day, from about 25 to about 500 mg/m$^2$/day, from about 100 to about 400 mg/m$^2$/day, or from about 150 to about 300 mg/m$^2$/day. In certain embodiments, the hematopoietic growth factor is administered in an amount of about 150, about 160, about 170, about 180, about 190, about 200, about 210, about 220, about 230, 240, 250, 260, 270, 280, 290, or about 300 mg/m$^2$/day. In certain embodiments, the hematopoietic growth factor is administered in an amount of about 250 mg/m$^2$/day.

In certain embodiments, the hematopoietic growth factor is administered subcutaneously. In certain embodiments, the hematopoietic growth factor is administered for 3, 4, 5, 6, 7, 8, 9, 10 days of a treatment cycle. In certain embodiments, the hematopoietic growth factor is administered for 5 days of a treatment cycle. In certain embodiments, the hematopoietic growth factor is administered on days 1-5 of a treatment cycle. In certain embodiments, the duration of the treatment cycle is 10 days.

In certain embodiments, the topoisomerase I inhibitor is administered in an amount from about 1 to about 100 mg/m²/day, about 10 to about 90 mg/m²/day, from about 20 to about 80 mg/m²/day, from about 30 to about 70 mg/m²/day, or from about 40 to about 60 mg/m²/day. In certain embodiments, the topoisomerase I inhibitor is administered in an amount of about 40, about 45, about 50, about 55, or about 60 mg/m²/day. In certain embodiments, the topoisomerase I inhibitor is administered in an amount of about 50 mg/m²/day.

In certain embodiments, the topoisomerase I inhibitor is administered intravenously. In certain embodiments, the topoisomerase I inhibitor is administered for 3, 4, 5, 6, 7, 8, 9, 10 days of a treatment cycle. In certain embodiments, the topoisomerase I inhibitor is administered for 5 days of a treatment cycle. In certain embodiments, the topoisomerase I inhibitor is administered on days 1-5 of a treatment cycle. In certain embodiments, the duration of the treatment cycle is 10 days. In certain embodiments, the topoisomerase I inhibitor is irinotecan.

In certain embodiments, the alkylating agent is administered in an amount from about 1 to about 450 mg/m²/day, about 20 to about 400 mg/m²/day, from about 60 to about 350 mg/m²/day, from about 80 to about 300 mg/m²/day, from about 100 to about 250 mg/m²/day, or from about 120 to about 200 mg/m²/day. In certain embodiments, the alkylating agent is administered in an amount of about 130, about 140, about 150, about 160, about 170, or about 180 mg/m²/day. In certain embodiments, the alkylating agent is administered in an amount of about 150 mg/m²/day.

In certain embodiments, the alkylating agent is administered intravenously or orally. In certain embodiments, the alkylating agent is administered for 3, 4, 5, 6, 7, 8, 9, 10 days of a treatment cycle. In certain embodiments, the alkylating agent is administered for 5 days of a treatment cycle. In certain embodiments, the alkylating agent is administered on days 1-5 of a treatment cycle. In certain embodiments, the duration of the treatment cycle is 10 days. In certain embodiments, the alkylating agent is temozolomide.

In certain embodiments, the topoisomerase I inhibitor and the alkylating agent are administered concurrently. In certain embodiments, the topoisomerase I inhibitor and the alkylating agent are administered concurrently on day 1-5 in a 10-day treatment cycle, wherein the topoisomerase I inhibitor is administered intravenously in an amount of about 50 mg/m²/day and the alkylating agent is administered orally or intravenously in an amount of about 150 mg/m²/day.

In certain embodiments, the topoisomerase I inhibitor is irinotecan. In certain embodiments, the alkylating agent is temozolomide.

In certain embodiments, the anti-GD2 antibody or antigen-binding fragment thereof, the hematopoietic growth factor(s), and the chemotherapeutic agent(s) are cyclically administered to a patient. Cycling therapy involves the administration of an active agent for a period of time, followed by a rest for a period of time, and repeating this sequential administration. Cycling therapy can reduce the development of resistance to one or more of the therapies, avoid or reduce the side effects of one of the therapies, and/or improves the efficacy of the treatment. In certain embodiments, the treatment stops after one cycle because the subject is intolerable to the adverse effects and toxicities associated with the therapeutic agents.

In certain embodiments, the number of cycles is from one to twenty-four cycles. In certain embodiments, the number of cycle is 1, 2, 3, 4, 5, 6, 7, 8, 9, 10,11, 12, 13, 14, 15, 16, 17, 18, 19, 20, 21, 22, 23, or 24. In certain embodiments, the duration of a cycle is from about 6 to about 15 days. In certain embodiments, the duration of a cycle is about 6, about 7, about 8, about 9, about 10, about 11, about 12, about 13, about 14, or about 15 days.

In certain embodiments, each cycle is followed with a rest period, where the anti-GD2 antibody or antigen-binding fragment thereof, the hematopoietic growth factor(s), and the chemotherapeutic agent(s) are not administered to the subject. In certain embodiments, the rest period is from about two weeks to about six weeks, from three weeks to about five weeks, from about four weeks to about six weeks. In certain embodiments, the rest period is about three weeks, about four weeks, about five weeks, or about six weeks. The present disclosure further allows the frequency, number, and length of dosing cycles and rest period to be adjusted.

4. Pharmaceutical Compositions

The present disclosure provides pharmaceutical compositions for treating neuroblastoma. In certain embodiments, the pharmaceutical composition comprises an anti-GD2 antibody or an antigen-binding fragment thereof, at least one hematopoietic growth factor, and at least one (e.g., two) chemotherapeutic agents. Pharmaceutical compositions can be used in the preparation of individual, single unit dosage forms. The pharmaceutical compositions can further comprise one or more pharmaceutically acceptable excipients.

Pharmaceutical compositions disclosed herein can further comprise at least one suitable auxiliary, such as, but not limited to, diluent, binder, stabilizer, buffers, salts, lipophilic solvents, preservative, adjuvant or the like. Pharmaceutically acceptable carriers can be routinely selected that are suitable for the mode of administration, solubility and/or stability of the anti-GD2 antibodies, the chemotherapeutic agent(s), and the hematopoietic growth factor(s).

Pharmaceutical excipients and additives useful in the disclosed compositions include but are not limited to proteins, peptides, amino acids, lipids, and carbohydrates (e.g., sugars, including monosaccharides, di-, tri-, tetra-, and oligosaccharides; derivatized sugars such as alditols, aldonic acids, esterified sugars and the like; and polysaccharides or sugar polymers), which can be present singly or in combination, comprising alone or in combination 1-99.99% by weight or volume. Exemplary protein excipients include serum albumin such as human serum albumin (HSA), recombinant human albumin (rHA), gelatin, casein, and the like. Representative amino acid/antibody components, which can also function in a buffering capacity, include alanine, glycine, arginine, betaine, histidine, glutamic acid, aspartic acid, cysteine, lysine, leucine, isoleucine, valine, methionine, phenylalanine, aspartame, and the like. Carbohydrate excipients suitable for use in the present disclosure include, for example, monosaccharides such as fructose, maltose, galactose, glucose, D-mannose, sorbose, and the like; disaccharides, such as lactose, sucrose, trehalose, cellobiose, and the like; polysaccharides, such as raffinose, melezitose, maltodextrins, dextrans, starches, and the like; and alditols, such as mannitol, xylitol, maltitol, lactitol, xylitol sorbitol (glucitol), myoinositol and the like.

The pharmaceutical compositions disclosed herein can also include a buffer or a pH adjusting agent; typically, the buffer is a salt prepared from an organic acid or base. Representative buffers include organic acid salts such as salts of citric acid, ascorbic acid, gluconic acid, carbonic acid, tartaric acid, succinic acid, acetic acid, or phthalic acid; Tris, tromethamine hydrochloride, or phosphate buffers.

Additionally, the pharmaceutical compositions disclosed herein can include polymeric excipients/additives such as polyvinylpyrrolidones, ficolls (a polymeric sugar), dextrates (e.g., cyclodextrins, such as 2-hydroxypropyl-β-cyclodextrin), polyethylene glycols, flavoring agents, antimicrobial agents, sweeteners, antioxidants, antistatic agents, surfactants (e.g., polysorbates such as "TWEEN 20™" and "TWEEN 80™"), lipids (e.g., phospholipids, fatty acids), steroids (e.g., cholesterol), and chelating agents (e.g., EDTA).

These and additional known pharmaceutical excipients and/or additives suitable for use in the pharmaceutical compositions disclosed herein are known in the art, e.g., as listed in "Remington: The Science & Practice of Pharmacy", 19.sup.th ed., Williams & Williams, (1995), and in the "Physician's Desk Reference", 52.sup.nd ed., Medical Economics, Montvale, N.J. (1998), the disclosures of which are entirely incorporated herein by reference.

EXAMPLE

The presently disclosed subject matter will be better understood by reference to the following Example, which is provided as exemplary of the presently disclosed subject matter, and not by way of limitation.

Example 1: Chemoimmunotherapy for High Risk Neuroblastoma Using a Combination Therapy of Hu3F8, Irinotecan/Temozolomide and Sargramostim The present study explores the safety and effectiveness of the combination of Hu3F8 antibody comprising a heavy chain variable region comprising the amino acid sequence set forth in SEQ ID NO: 11, and a light chain variable region comprising the amino acid sequence set forth in SEQ ID NO: 5, of irinotecan and temozolomide (IT), and Sargramostim (GM-CSF) termed "HITS" in patients with resistant neuroblastoma. The present study also evaluates tumor responses to HITS in patients with neuroblastoma, evaluate pharmacokinetics of hu3F8. Patients receive treatment per the scheme outlined below for each cycle.

TABLE 1

| Treatment schedule | | | | | | | |
|---|---|---|---|---|---|---|---|
| Day | | | | | | | |
| 1 | 2 | 3 | 4 | 5 | 6-10 | 8 | 10 |
| Treatment IT | IT + Hu3F8 | IT | IT + Hu3F8 | IT | GM-CSF | Hu3F8 | Hu3F8 |

Patients is monitored for toxicity weekly and for response after the first two cycles, and then after every third subsequent cycle. If eligible, patients may receive cycles every 4-6 weeks for up to two years.

The present study also evaluates NK cell activation in patients treated with HITS and evaluate serum cytokines in patients receiving HITS. NK cells are known to be critical to elicit the anti-neuroblastoma activity observed with both 3F8 (Venstrom et al., Clin Cancer Res 15:7330-4, 2009) and the immunocytokine hu14. 18-IL2 (Delgado et al., Cancer Res 70:9554-61, 2010). To explore the mechanisms of IT and anti-GD2 antibodies, the present study evaluates NK cell activation before IT, before hu3F8 and after hu3F8. NK cell activation via CD107a expression and intracellular interferon-gamma (IFN-γ) release are accessed. In addition, cytokines related to anti-tumor cytotoxicity in the blood is measured, including interleukin-6 (IL-6), interleukin-10 (IL-10), tumor necrosis factor-α (TNF-α) and interferon-γ (IFN-γ). Assays are performed using an available clinically validated assay.

The present study further evaluates MRD changes in circulating cell-free tumor RNA (cfRNA) in the blood versus tumor cell-bound RNA in bone marrow (BM). It was previously demonstrated that BM MRD using qRT-PCR of cell bound RNA is highly predictive of clinical outcome for 3F8+GMCSF immunotherapy in all disease stages, i.e., patients in first CR/VGPR, those with primary refractory disease and patients in second remission (Cheung I Y et al., J Clin Oncol 21:3853-8, 2003). A MRD marker panel of 4 genes has been used in previous studies: cyclin D1 (CCND1), ISL LIM homeobox 1 (ISL1), paired-like homeobox 2b (PHOX2B), and GD2 synthase (B4GALNT1). However, BM testing is an invasive procedure requiring sedation with its accompanying risks, as well as complications (such as pain and bruising). qRT-PCR of cell bound RNA extracted from blood is not as predictive as RNA from BM. The present study measures circulating cfRNA of the above 4 genes in blood at time points when BM MRD is being measured. The tumor-associated transcripts in blood cfRNA may be used for non-invasive monitoring of metastatic neuroblastoma.

Study Design Intervention

Patients receives treatment as described in Table 1 above. They are evaluated at least once weekly for toxicity. Patients are evaluable for toxicity if they receive at least one dose each of irinotecan, temozolomide and hu3F8. If patients do not experience significant toxicity necessitating discontinuation of therapy, they receive a second cycle approximately 21-35 days from the end of irinotecan/temozolomide. Extent of disease evaluation is carried out after two cycles and if there is no progressive disease and if no significant toxicity is observed, patients may receive HITS therapy for up to 2 years. Correlative studies include assessment of NK cell activation, cytokine release, BM MRD and circulating cfRNA.

Schema for each cycle is shown in Table 2. Fourteen patients are studied in this study. Patients are removed from study if they suffer either progressive disease (PD) or major toxicity.

Briefly, each cycle consists of four doses of hu3F8, five doses each of irinotecan and temozolomide and five doses of GM-CSF (Table 1). Irinotecan 50 mg/m$^2$/day IV is administered from day 1-5 concurrently with temozolomide 150 mg/m$^2$/day orally. Hu3F8 2.25 mg/kg IV is administered on days 2, 4, 8 and 10. GM-CSF 250 mg/m$^2$/day SC is administered on days 6-10.

TABLE 2

Schema for each cycle.

| Day | Intervention |
|---|---|
| | Treatment Schema for each cycle |
| 1 | Irinotecan 50 mg/m²/day IV + temozolomide 150 mg/m²/day PO or IV* |
| 2 | Blood draw for NK cell activation and cytokine release** followed by irinotecan 50 mg/m²/day IV+ temozolomide 150 mg/m²/day PO or IV followed by hu3F8 2.25 mg/kg/day IV |
| 3 | Irinotecan 50 mg/m²/day IV + temozolomide 150 mg/m²/day PO or IV |
| 4 | Irinotecan 50 mg/m²/day IV+ temozolomide 150 mg/m²/day PO or IV followed by hu3F8 2.25 mg/kg/day IV |
| 5 | Irinotecan 50 mg/m²/day IV + temozolomide 150 mg/m²/day PO or IV |
| 6-10 | GM-CSF 250 mg/m²/day SC |
| 8 | hu3F8 2.25 mg/kg/day IV |
| 10 | hu3F8 2.25 mg/kg/day IV followed by blood draw for NK cell activation and cytokine release** |
| 19-26 | Blood draw for HAHA testing |
| Days 1 to 26-40 | Physical examination, CBC and clinical chemistry including renal and liver function tests once a week until next cycle starts (or until patient comes off study) |

*Temozolomide can be given IV at the discretion of the PI.
** Blood draws for NK cell activation and cytokine release performed only during cycle 1

Monitoring for toxicities: Clinical observation for toxicity is undertaken at weekly outpatient visits while the patient is on study. Biochemical testing for liver and kidney function and complete blood counts is carried out at least weekly while the patient is on study.

Tumor response: Disease status is evaluated after the first two cycles and after every third subsequent cycle. Patients who are withdrawn from study after one cycle still have disease status evaluated if feasible.

NK cell activation and cytokine release: is assessed on blood draws during cycle 1. Blood is tested prior to therapy, prior to the first dose of hu3F8 (on day 2) and after the last dose of hu3F8 (on day 10).

BM cell-bound RNA and circulating blood cfRNA is assessed before cycle 1 and at each extent of disease evaluation.

Human antihuman antibody response (HAHA) titer: is tested after every cycle and at the end of therapy using an established ELISA assay.

Eligibility for cycle 2: Patients may receive the second cycle if they satisfy all the following requirements:
Negative HAHA titer, defined as ≤1300 Elisa units/ml.
Have recovered from myelosuppression (if any) as defined by ANC >500 and platelets 35,000 independent of transfusions.
Have recovered from myelosuppression by ≤day 40 from the start of therapy.
Have not experienced any significant toxicities necessitating removal from study If patients develop a positive HAHA titer, they may continue to receive IT±HAHA reversal therapy with rituximab and cyclophosphamide until HAHA titer becomes negative. After HAHA becomes negative, patients may restart hu3F8. Subsequent cycles can only be commenced at a minimum of 21 and a maximum of 35 days after the last dose of irinotecan/temozolomide on the previous cycle.

Eligibility to continue therapy beyond cycle 2: Patients may continue on therapy if they meet all criteria to receive the second cycle (as defined above) AND if they do not have PD. If patients develop a positive HAHA titer, they may continue to receive IT±HAHA reversal therapy with rituximab and cyclophosphamide until HAHA titer becomes negative.

Therapeutic/Diagnostic Agents Used for this Study
Humanized Monoclonal Antibody hu3F8-IgG1

Hu3F8-IgG1 is a humanized antibody of the IgG1 subclass. The final product is manufactured, formulated and tested for identity, purity, potency, sterility, endotoxin and stability. The purified antibody hu3F8 is stored frozen at −20° C. in glass vials, at either 2 mg/ml or 1.7 mg/ml in a 25 mM sodium citrate/sodium chloride buffer. For IV use, hu3F8 should be thawed at ambient temperature and diluted in 5% human serum albumin. Each dose is Millipore (0.22 µm) filtered before use.

Sargramostim (Yeast-Derived Human Recombinant Granulocyte-Macrophage Colony Stimulating Factor; GM-CSF)

Sargramostim is available as a sterile, white, preservative-free, 250 mcg single use vial of lyophilized powder or a 500 mcg/1 mL injectable solution.

The 250 mcg vials require aseptic reconstitution with 0.5 mL STERILE WATER for Injection, USP (without preservative). During reconstitution, the Sterile Water for Injection, USP should be directed at the side of the vial and the contents gently swirled to avoid foaming during dissolution. The reconstituted sargramostim solutions are clear, colorless, isotonic with a pH of 7.4±0.3, and contain 500 mcg/mL of sargramostim. The single-use 250 mcg vials contain no antibacterial preservative, and therefore should be administered as soon as possible, and within 6 hours following reconstitution. They are intended for single use only and should not be re-entered or reused. Vials containing 500 mcg/1 mL of sargramostim are already in solution and are multiple dose vials. For subcutaneous administration, further dilution is not required. Liquid sargramostim may be stored for up to 20 days at 2-8° C. once the vial has been entered.

Aseptic technique should be employed in the preparation of all sargramostim solutions. To assure correct concentration following reconstitution, care should be exercised to eliminate any air bubbles from the needle hub of the syringe used to prepare the diluent. Parenteral products should be inspected visually for particulate matter and discoloration prior to administration whenever solution and container permit.

Irinotecan (Camptosar™, CPT-11)

Irinotecan hydrochloride trihydrate (CPT-11) is a topoisomerase I inhibitor. The drug is supplied in two forms: 2 mL vials containing 40 mg of drug and 5 mL vials containing 100 mg of drug. The drug is supplied in brown vials and appears as a pale-yellow-to-yellow crystalline powder and pale yellow transparent solution when reconstituted.

Irinotecan is diluted with D5W to a total volume of 500 ml and infused IV over 60 minutes.

Temozolomide (Temodar™) Temozolomide is an alkylating agent of imidazotetrazinone class. Temozolomide is administered orally or intravenously. Temozolomide is rapidly and completely absorbed after oral administration; peak plasma concentrations occur in 1 hour. Temozolomide is rapidly eliminated with a mean elimination half-life of 1.8 hours and exhibits linear kinetics over the therapeutic dosing range. Temozolomide has a mean apparent volume of distribution of 0.4 L/kg (% CV=13%). It is weakly bound to human plasma proteins; the mean percent bound of drug-related total radioactivity is 15%.

Metabolism and Elimination: Temozolomide is spontaneously hydrolyzed at physiologic pH to the active species, 3-methyl-(triazen-1-yl) imidazole-4-carboxamide (MTIC)

and to temozolomide acid metabolite. MTIC is further hydrolyzed to 5-amino-imidazole-4-carboxamide (AIC), which is known to be an intermediate in purine and nucleic acid biosynthesis and to methylhydrazine, which is believed to be the active alkylating species. Cytochrome P450 enzymes play only a minor role in the metabolism of temozolomide and MTIC. Relative to the AUC of temozolomide, the exposure to MTIC and ACI is 2.4% and 23% respectively. About 38% of the administered temozolomide total radioactive dose is recovered over 7 days; 37.7% in urine and 0.8% in feces. The majority of the recovery of radioactivity in urine is as unchanged temozolomide (5.6%), AIC (12%), temozolomide acid metabolite (2.3%), and unidentified polar metabolites(s) (17%). Overall clearance of temozolomide is about 5.5 L/hr/m$^2$ Criteria for Subject Eligibility Subject Inclusion Criteria Diagnosis of neuroblastoma as defined by international criteria, i.e., histopathology or bone marrow metastases plus high urine catecholamine levels (Brodeur et al., J Clin Oncol 11:1466-77, 1993).

High-risk neuroblastoma as defined as any of the following:

Stage 4 with MYCN amplification (any age)
Stage 4 without MYCN amplification (>1.5 years of age)
Stage 3 with MYCN amplification (unresectable; any age)
Stage 4S with MYCN amplification (any age)

Patients must have a history of tumor progression or relapse or failure to achieve complete response following standard high-dose induction chemotherapy. Patients must have evaluable (microscopic marrow metastasis, elevated tumor markers, positive MIBG or PET scans) or measurable (CT, MRI) disease documented after completion of prior systemic therapy. Prior treatment with murine and hu3F8 is allowed. Prior treatment with irinotecan or temozolomide is permitted. Patients with prior m3F8, hu3F8, ch14.18 or hu14.18 treatment must have HAHA antibody titer ≤1300 Elisa units/ml. Human anti-mouse antibody positivity is allowed. Signed informed consent indicating awareness of the investigational nature of this program.

Subject Exclusion Criteria

Patients with CR/VGPR disease; existing severe major organ dysfunction, i.e., renal, cardiac, hepatic, neurologic, pulmonary, or gastrointestinal toxicity >grade 3 except for hearing loss, alopecia, anorexia, nausea, and hypomagnesemia from TPN, which may be grade 3; ANC <500/uL; platelet count <35K/uL; history of allergy to mouse proteins; active life-threatening infection; inability to comply with protocol requirements; women who are pregnant or breast-feeding.

Treatment/Intervention Plan

Patients receive treatment as described in Table 1 above. Patients are evaluated at least once weekly for toxicity. Patients are evaluable for toxicity if they receive at least one dose each of irinotecan, temozolomide and hu3F8. If patients do not experience significant toxicity, they receive a second cycle which is 4-6 weeks after the first cycle. Extent of disease evaluation is carried out after two cycles; if there is no progressive disease and patients do not experience significant toxicity, they may receive combination therapy up to 2 years. Responses are evaluated after every three subsequent cycles. Correlative studies include assessment of NK cell activation, cytokine release, BM MRD (cell-bound RNA) and blood MRD (cfRNA). Schema for each cycle is shown above in Table 2.

Irinotecan is administered as an IV infusion over 60±15 minutes. Anti-emetics is administered as necessary.

Temozolomide is administered orally. The dose of temozolomide is adjusted such that it can be administered using available capsules i.e. is rounded off to the nearest 5 mg. Patients may receive IV temozolomide at the same dose. Infusion rate is as per standard of care.

Hu3F8 is administered IV over ~30-90 minutes. No dose reductions are allowed. To modulate pain from hu3F8, patients are premedicated with analgesics (e.g., hydromorphone) and antihistamines (e.g., diphenhydramine or hydroxyzine). On days when co-administered with GM-CSF, hu3F8 is started ~30-90 mins after GM-CSF.

GMCSF is administered subcutaneously.

Blood is drawn prior to starting therapy and on days 2 (prior to hu3F8) and 10 (after hu3F8). Assays for NK cell activation and cytokine release (for IL-6, IL-10, TNF-α and IFN-γ) are carried out using previously described methods. NK cell activation and cytokine release are studied only during the first cycle.

BM MRD and blood MRD are studied prior to starting therapy and at each extent of disease evaluation. BM MRD is studied on pooled heparinized BM samples using previously established techniques. Blood MRD is studied on cell free RNA, extracted and analyzed from peripheral blood samples collected in Streck tubes.

Patients are eligible for a second cycle of chemotherapy if they fulfill ALL the following criteria:

Negative HAHA titer.

Have recovered from myelosuppression (if any) as defined by ANC >500 and platelets >35,000.

Have recovered from myelosuppression by ≤day 40 from the start of therapy.

Have not experienced any significant toxicities necessitating removal from study (as defined in section 9.12)

If patients develop a positive HAHA titer, they may continue to receive IT±HAHA reversal therapy with rituximab and cyclophosphamide until HAHA titer becomes negative. Second and subsequent cycles can only be commenced at a minimum of 21 and a maximum of 35 days after the last irinotecan/temozolomide dose of the previous cycle.

Patients who do not have disease progression as evaluated approximately 21-35 days after the last dose of irinotecan/temozolomide in the second cycle and continue to meet eligibility criteria defined above can continue to further cycles of HITS. Extent of disease evaluations are performed after the first two cycles, and then every three cycles. Subsequent cycles can only be commenced at a minimum of 21 and a maximum of 35 days after the last dose of irinotecan/temozolomide on previous cycle.

G-CSF (5-10 ug/kg) may be used when ANC <500u/L.

The following toxicities necessitate discontinuation of therapy for a particular patient:

Grade 4 toxicity, other than myelosuppression (and its sequelae namely thrombocytopenia-related bleeding, febrile neutropenia and infection), clearly attributable to HITS.

Grade 3 toxicities should have subsided to ≤grade 2 within 35 days of the first dose of IT of the prior cycle in order to continue therapy.

Evaluation During Treatment Intervention

The following evaluations are carried out during treatment:

TABLE 3

Evaluations on Protocol

| Tests | Pre-treatment | During Treatment | During Follow-up |
|---|---|---|---|
| Clinical history and exam, including blood pressure | ✓ | Weekly | As clinically indicated |
| Complete blood count | ✓ | Weekly | As clinically indicated |
| Clinical chemistry, including serum sodium, potassium, chloride, calcium, bicarbonate | ✓ | Weekly | As clinically indicated |
| Liver and renal function tests, including ALT, AST, alkaline phosphatase, total bilirubin, BUN, creatinine, and LDH | ✓ | Weekly | As clinically indicated |
| Bone marrow aspirates from bilateral anterior and bilateral posterior iliac crests and biopsies from any 2 sites; studies for: a) standard histochemical methods for the presence of tumor cells; b) real time quantitative RT-PCR of a previously established four gene panel | ✓ | After Cycle 2; then after every 3 cycles | As clinically indicated |
| CT or MRI of primary tumor site, and/or MIBG/PET | ✓ | After Cycle 2; then after every 3 cycles | As clinically indicated |
| Pregnancy test, if applicable | ✓ | — | — |
| Echocardiogram | ✓ | — | — |
| Blood for HAHA | ✓, if applicable | After every cycle | At the end of therapy |
| Blood draw (heparinized blood) for NK cell activation markers (CD107 and IFNg) | ✓ | Cycle 1: Before treatment on Day 2; after treatment on Day 10 | — |
| Blood draw for baseline cytokine levels (Interleukin-6 (IL-6), interleukin-10 (IL-10), tumor necrosis factor-α (TNF-α) and interferon-γ (IFN-γ) | ✓ | Cycle 1: Before treatment on Day 2; after treatment on Day 10 | — |
| Blood draw (Streck tubes) for circulating cfRNA | | At time of bone marrow testing | — |

Toxicities/Side Effects

Adverse events are any unfavorable or unintended sign (including an abnormal laboratory finding) symptom or disease temporally associated with the use of a medical treatment or procedure regardless of whether it is considered related to the medical treatment or procedure (attribution of unrelated, unlikely, possible, probable or definite). In Cycle 1, all observed adverse events, regardless of treatment group or suspected causal relationship to study drug are recorded. In subsequent cycles, only >Grade 3 expected toxicities and >Grade 2 unexpected toxicities are recorded. Adverse events are identified and graded using the NCI Common Toxicity Criteria Version 4.0 developed by the National Cancer Institute (NC I) of the USA. Next it is determined if the adverse event is related to the medical treatment (attribution). Serious Adverse Events (SAEs).

Toxicities Associated with Irinotecan

Common/expected: Diarrhea that may lead to dehydration, abdominal cramping, nausea and vomiting, anorexia and weight loss, constipation, sweating and flushing, alopecia, asthenia, myelosuppression, fever, mucositis, cough, dyspnea, rash and lacrimation and diaphoresis as part of a cholinergically mediated syndrome Occasional: allergic reactions, anaphylaxis, thrombosis
Rare: interstitial lung disease, nephrotoxicity, hepatotoxicity, gastrointestinal bleeding, local irritation at infusion sites.

Patients are permitted to receive treatment to reduce the severity of irinotecan-induced diarrhea, including antibiotics or atropine, activated charcoal, loperamide, atropine and diphenoxylate.

Toxicities Associated with Temozolomide
Common/expected: Nausea, vomiting, anorexia, constipation, diarrhea, fatigue, myelosuppression, alopecia, weakness, paralysis.
Occasional: headaches, hepatotoxicity.
Rare: allergic reactions, opportunistic infection, secondary malignancy, rash, aplastic anemia.

Toxicities associated with hu3F8
Common/expected: pain, hypertension, hypotension, tachycardia, urticaria, fever, nausea, emesis, somnolence.
Occasional: serum sickness, cough or wheezing, diarrhea, hyponatremia, peripheral neuropathy, impaired accommodation of the eye, poor reactivity of pupils to light, elevated transaminase, airway constriction, paresthesia.
Rare: anaphylaxis and posterior reversible encephalopathy syndrome (PRES).

Toxicities Associated with GM-CSF
Common/expected: bone pain, local reaction at site of injection, leukopenia shortly after injection, and decrease in platelet count.
Occasional: fevers, flushing, allergic reactions
Rare: weight gain, pleural or pericardial effusion, pericardial embolism, thrombosis, and difficulty breathing after first injection Toxicities are only captured up to 30 days after the last treatment or until the patient begins a new treatment, whichever is earlier.

Criteria for Therapeutic Response Outcome Assessment

Response duration is calculated from first day of treatment with IT. Patients are considered a response failure under this protocol if progressive disease is evident at any time.

Disease response for neuroblastoma use the International neuroblastoma Response Criteria (INRC)(Brodeur et al., J Clin Oncol 11:1466-77, 1993), which is incorporated as reference to the present disclosure in its entirety:
Complete response/remission (CR): no evidence of disease.
Very good partial response/remission (VGPR): >90% decrease in all disease parameters, except bone scan unchanged or improved; bone marrow must be free of disease.
Partial response/remission: >50% decrease in all disease parameters, except bone scan unchanged or improved; <1 positive BM site.
Mixed response: >50% decrease in >1 but not all disease markers.
Stable disease: <50% decrease in all tumor markers.
Progressive disease: new lesion, or >25% increase in any disease marker.

Adequacy of trial: All patients who fulfill the eligibility requirements and receive one dose of hu3F8 treatment is considered evaluable for toxicity.

Criteria for Removal from Study

Patients come off treatment if there is progressive disease at any time and are followed for 30 days from last treatment or until they start a new treatment, whichever is earlier, before being removed from study. Best clinical judgment is used to determine whether a patient must undergo tests between cycles to make sure disease is not progressing. Patients come off treatment if they have a grade 4 toxicity (other than myelosuppression) clearly attributable to treatment with HITS.

The study for the drug treatment is discontinued for the following reasons:
Adverse events, including unacceptable toxicity or exacerbation of underlying disease, associated with study drug administration and necessitating discontinuation of treatment. Patients who are removed from the study due to adverse events are treated and followed according to established, acceptable medical practice. All pertinent information concerning the outcome of such treatment is entered in the MSKCC institutional Clinical Research Database (CRBD). Patients are followed until resolution or stabilization of the adverse event.
Withdrawal of consent. The patient's desire to withdraw from the study may occur at any time.
Withdrawal by the physician for clinical reasons not related to study drug treatment in the absence of an adverse event.
Violation of the study protocol, including failure to return for required treatments or assessments. Patients who fail to return for treatments are withdrawn from the study if more than one scheduled dose is missed.

Biostatistics

This is a study of combination of irinotecan and temozolomide (IT) with hu3F8 and GM-CSF in patients with resistant neuroblastoma. The regimen is considered safe if there are no toxicities requiring discontinuation of therapy in at least 9/10 patients during the first two cycles. Observing $1/10$ toxicities result in 95% confidence interval for the toxicity rate being (0.005, 0.4). If the true toxicity rate is 5%, the probability to see 0 or 1 toxicity is 91%, and probability to see 2 or more toxicities is 9%. If the true toxicity rate is 10%, the probability to see 0 or 1 toxicity is 74%, and probability to see 2 or more toxicities is 26%. If the true toxicity rate is 20%, the probability to see 0 or 1 toxicity is 38%, and probability to see 2 or more toxicities is 62%.

Nine patients are required to complete two cycles without discontinuation of therapy due to toxicity in order for the protocol to be considered safe. If patients come off the study during the first two cycles of treatment due to other reasons such as progressive disease or self-removal, including self-removal due to toxicities other than DLT's, they are replaced for assessment of safety. If patients have a DLT, they come off protocol and are not be replaced.

Secondary and exploratory endpoints include response rate, pharmacokinetics of hu3F8, levels of NK cell activation, serum cytokines, and changes in cell-free RNA and MRD status in bone marrow. Pharmacokinetics measurements, levels of NK cell activation and serum cytokines are analyzed with summary statistics including mean, median and standard deviation. Patients achieving CR, VGPR or PR are considered to have had a response. The best response at any point is considered in response evaluation. Response rate and the proportion of patients with the concordant MRD status between cfRNA and tumor RNA are summarized as a proportion with the corresponding 95% confidence interval. Accrual rate is expected to be one patient bimonthly.

Example 2: Hu3F8-Based Chemoimmunotherapy for Resistant High-Risk Neuroblastoma: Preliminary Results of HITS Pilot/Phase H Multicenter Study Chemoresistant and relapsed diseases are major obstacles to curing high-risk neuroblastoma (HR-NB). Anti-GD2 monoclonal antibodies (MoAbs) can be effective in preventing relapse after remission. However, responses in relapsed or progressive diseases (PD) can be rare. The present example investigated the combination of humanized anti-GD2 MoAb Hu3F8 antibody comprising a heavy chain according to sequence ID No. 11, and a light chain sequence according to sequence ID No. 5, irinotecan, temozolomide and sargramostim (HITS) in treating HR-NB. Sargramostim is a recombinant human GM-CSF. The pilot HITS protocol against resistant HR-NB was now expanded to a phase II multicenter study (NCT03189706).

Salient eligibility criteria included having an evaluable or measurable chemoresistant disease. Prior anti-GD2 MoAbs and/or irinotecan/temozolomide (I/T) therapy was permitted. Each cycle comprised of irinotecan 50 mg/m$^2$/day intravenously (IV) plus temozolomide 150 mg/m$^2$/day IV or orally (days 1-5); Hu3F8 antibody 2.25 mg/kg/day IV over 30 minutes (days 2, 4, 8 and 10); and GM-CSF 250 mg/m$^2$/day subcutaneously (days 6-10). Toxicities were evaluated by Common Terminology Criteria for Adverse Events (CTCAE) v4.0, and responses were evaluated by modified International Neuroblastoma Response Criteria.

Twenty-nine heavily prior-treated patients had received 99 (range 1-9) cycles. Of which, 15 were enrolled on protocol and 14 were enrolled on compassionate/single-patient-use basis. The median age of the patients at the enrollment was 86.9 months, and the median number of prior relapses was 2. At enrollment, 4 patients had HR-NB refractory to induction chemotherapy, while 25 had prior relapse. Toxicities included myelosuppression and diarrhea, which were expected with I/T, and pain and hypertension, which were expected with Hu3F8 antibody. No other >grade 2 related toxicities occurred; treatment was outpatient. Responses, assessed after 2 cycles, were documented in 14 (48%) patients, of which six were complete response, six were partial response, and two were mixed. Five patients had stable disease. Responses were achieved in refractory (2/4; 50%) and PD (12/25; 48%) subgroups. Responses were also achieved in patients who had previously received I/T (11/20; 55%) and/or anti-GD2 MoAbs (10/19; 53%). Responses were observed in soft tissue (4/16; 25%) and osteomedullary sites (11/24; 45%).

The present example showed that the present high-dose Hu3F8 antibody-based chemoimmunotherapy was safe and effective against chemoresistant HR-NB.

Example 3: Hu3F8-Based Chemoimmunotherapy for Resistant High-Risk Neuroblastoma: Preliminary Results of "HITS" Pilot/Phase H Study Chemoresistant and relapsed disease are major obstacles to curing high-risk neuroblastoma (HR-NB). Anti-GD2 monoclonal antibody (MoAb) is effective in preventing relapse after remission, but responses in relapsed or progressive diseases (PD) are rare. We investigated the combination of humanized anti-GD2 MoAb Hu3F8 antibody comprising a heavy chain according to sequence ID No. 11, and a light chain sequence according to sequence ID No. 5, irinotecan, temozolomide and sargramostim (GM-CSF): a pilot "HITS" protocol against resistant HR-NB now expanded to a phase II study (NCT03189706).

Salient eligibility criteria included evaluable or measurable chemoresistant diseases. Prior anti-GD2 MoAb and/or irinotecan/temozolomide (I/T) therapies were permitted. Each cycle comprised of irinotecan 50 mg/m$^2$/day intravenously (IV) plus temozolomide 150 mg/m$^2$/day IV or orally (days 1-5); Hu3F8 antibody 2.25 mg/kg/day IV over 30 minutes, days 2, 4, 8 and 10 (total 9 mg/kg), and GM-CSF 250 mg/m2/day subcutaneously, days 6-10. Toxicity was measured by CTCAE v4.0 and responses by INRC.

Forty-six (23 enrolled on protocol; 23 enrolled on compassionate-use basis) heavily prior-treated patients (median age at enrollment: 6.6 years; median number of prior relapses: 2) received 175 (median 2; range 1-12) cycles. At enrollment, 7 patients had HR-NB refractory to induction chemotherapy while 39 had prior relapse. Toxicities included myelosuppression and diarrhea expected with I/T, and pain and hypertension expected with Hu3F8 antibody. No other >grade 2 related toxicities occurred; treatment was outpatient. Early responses, which were assessed after 2 cycles, were documented in 18 (39%) patients (complete response, n=9; partial response, n=8; mixed response, n=1), of which 13 patients had stable disease. Responses were achieved in refractory (3/7; 43%) and PD (15/39; 38%) subgroups; in patients who had previously received I/T (12/34; 35%) and/or anti-GD2 MoAb (14/36; 39%); and in soft tissue (6/22; 27%), MIBG-avid skeletal sites (20/36; 56%), and on bone marrow histology (9/12; 75%).

The present example showed that the present high-dose Hu3F8 antibody-based chemoimmunotherapy is safe and effective against chemoresistant HR-NB.

Although the presently disclosed subject matter and its advantages have been described in detail, it should be understood that various changes, substitutions and alterations can be made herein without departing from the spirit and scope of the invention. Moreover, the scope of the present application is not intended to be limited to the particular embodiments of the process, machine, manufacture, and composition of matter, means, methods and steps described in the specification. As one of ordinary skill in the art will readily appreciate from the invention of the presently disclosed subject matter, processes, machines, manufacture, compositions of matter, means, methods, or steps, presently existing or later to be developed that perform substantially the same function or achieve substantially the same result as the corresponding embodiments described herein may be utilized according to the presently disclosed subject matter. Accordingly, the appended claims are intended to include within their scope such processes, machines, manufacture, compositions of matter, means, methods, or steps.

Various patents, patent applications, publications, product descriptions, protocols, and sequence accession numbers are cited throughout this application, the inventions of which are incorporated herein by reference in their entireties for all purposes.

What is claimed is:

1. A method of treating a human subject having chemoresistant neuroblastoma, comprising administering to the subject a therapeutically effective amount of an anti-GD2 antibody or an antigen-binding fragment thereof, and at least one hematopoietic growth factor, irinotecan, and temozolomide,
wherein the anti-GD2 antibody or antigen-binding fragment thereof each comprises:
a) a heavy chain variable region comprising a CDR1 comprising amino acid residues 31 to of SEQ ID NO: 4, a CDR2 comprising amino acid residues 50 to 65 of SEQ ID NO: 4, and a CDR3 comprising amino acid residues 98 to 108 of SEQ ID NO: 4, and a light chain variable region comprising a CDR1 comprising amino acid residues 24 to 34 of SEQ ID NO: 5, a CDR2 comprising amino acid residues 50 to 56 of SEQ ID NO: 5, and a CDR3 comprising amino acid residues 89 to 94 of SEQ ID NO: 5; or
b) a heavy chain variable region comprising a CDR1 comprising amino acid residues 31 to of SEQ ID NO: 11, a CDR2 comprising amino acid residues 50 to 65 of SEQ ID NO: 11, and a CDR3 comprising amino acid residues 98 to 108 of SEQ ID NO: 11, and a light chain variable region comprising a CDR1 comprising amino acid residues 24 to 34 of SEQ ID NO: 5, a CDR2 comprising amino acid residues 50 to 56 of SEQ ID NO: 5, and a CDR3 comprising amino acid residues 89 to 94 of SEQ ID NO: 5.

2. The method of claim 1, wherein the heavy chain variable region comprises an amino acid sequence that is at least 80%, 85%, 95%, 96%, 97%, 98%, or 99% identical to the amino acid sequence set forth in SEQ ID NO:11 or SEQ ID NO: 4, and/or the light chain variable region comprises an amino acid sequence that is at least 80%, 85%, 90%, 95%, 96%, 97%, 98%, or 99% identical to the amino acid sequence set forth in SEQ ID NO: 5.

3. The method of claim 1, wherein the heavy chain variable region comprises the amino acid sequence set forth in SEQ ID NO:11 or SEQ ID NO: 4, and the light chain variable region comprises the amino acid sequence set forth in SEQ ID NO: 5.

4. The method of claim 1, wherein the anti-GD2 antibody is a humanized 3F8 (hu3F8) antibody.

5. The method of claim 1, wherein
the at least one hematopoietic growth factor is selected from the group consisting of a granulocyte colony-stimulating factor (G-CSF), a granulocyte-macrophage colony-stimulating factor (GM-CSF), and combinations thereof.

6. The method of claim 5, wherein the GM-CSF is a recombinant GM-CSF.

7. The method of claim 6, wherein the recombinant GM-CSF is sargramostim.

8. The method of claim 1, wherein the anti-GD2 antibody is a humanized 3F8 (hu3F8) antibody.

9. The method of claim 1, wherein
a) the anti-GD2 antibody or antigen-binding fragment thereof is intravenously administered in an amount of 2.25 mg/kg per day; and/or
b) the hematopoietic growth factor is subcutaneously administered in an amount of 250 mg/m$^2$ per day.

10. The method of claim 1, wherein
a) the irinotecan is intravenously administered in an amount of 50 mg/m$^2$ per day and/or;
b) the temozolomide is orally or intravenously administered in an amount of 150 mg/m$^2$ per day.

11. The method of claim 1, wherein the anti-GD2 antibody or antigen-binding fragment thereof, the at least one hematopoietic growth factor, the irinotecan, and the temozolomide are administered cyclically.

12. The method of claim 11, wherein
a) the number of cycles is from one to twenty-four cycles;
b) the duration of each cycle is 10 days; and/or
c) each cycle is followed by a rest period, wherein the rest period is from three weeks to five weeks or from four weeks to six weeks.

13. The method of claim 11, wherein one cycle comprises:
a) the administration of the anti-GD2 antibody or antigen-binding fragment thereof during four days in the cycle;
b) the administration of the at least one hematopoietic growth factor 5 days in the cycle; and/or
c) the administration of the irinotecan and/or the temozolomide during 5 days in the cycle.

14. The method of claim 13, wherein
a) the anti-GD2 antibody or antigen-binding fragment thereof is administered on day 2, 4, 8, and 10 in the cycle;
b) the at least one hematopoietic growth factor is administered on days 6-10 in the cycle; and/or
c) the irinotecan and/or the temozolomide is administered on days 1-5 in the cycle.

15. The method of claim 1, wherein the neuroblastoma is refractory neuroblastoma, relapsed neuroblastoma, or relapsed and refractory neuroblastoma.

* * * * *